United States Patent
Marupaduga et al.

(10) Patent No.: US 11,140,639 B1
(45) Date of Patent: Oct. 5, 2021

(54) USE OF POWER CLASS AS BASIS TO CONTROL CONFIGURATION OF MU-MIMO SERVICE

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/212,252

(22) Filed: Dec. 6, 2018

(51) Int. Cl.
| | |
|---|---|
| *H04W 52/36* | (2009.01) |
| *H04B 7/0452* | (2017.01) |
| *H04W 72/12* | (2009.01) |
| *H04W 72/04* | (2009.01) |
| *H04W 92/10* | (2009.01) |

(52) U.S. Cl.
CPC ........ *H04W 52/367* (2013.01); *H04B 7/0452* (2013.01); *H04W 72/0473* (2013.01); *H04W 72/12* (2013.01); *H04W 92/10* (2013.01)

(58) Field of Classification Search
CPC ........... H04W 52/00–60; H04W 72/12; H04W 72/0473; H04W 92/10; H04B 7/0452
See application file for complete search history.

(56) References Cited

U.S. PATENT DOCUMENTS

| | | |
|---|---|---|
| 2007/0223423 A1 | 9/2007 | Kim et al. |
| 2008/0037671 A1 | 2/2008 | Lee et al. |
| 2012/0003969 A1* | 1/2012 | Anderson ............. H04W 76/40 455/414.2 |
| 2012/0163483 A1 | 6/2012 | Stacey et al. |
| 2013/0201925 A1* | 8/2013 | Li ........................ H04L 27/2646 370/329 |
| 2014/0204766 A1* | 7/2014 | Immendorf ........... H04W 24/04 370/242 |
| 2014/0314166 A1 | 10/2014 | Gomadam et al. |
| 2016/0345343 A1 | 11/2016 | Elsherif et al. |
| 2018/0092102 A1* | 3/2018 | Pefkianakis ......... H04B 7/0452 |
| 2018/0249428 A1* | 8/2018 | Huang ................ H04W 52/365 |

(Continued)

FOREIGN PATENT DOCUMENTS

EP          3 065 307          2/2018

OTHER PUBLICATIONS

W. Gerstacker and M. Ruder, "Joint User Pairing and Resource Allocation for Multiuser SC-FDMA Transmission," FAU, Eurecom, Sep. 14, 2011.

(Continued)

*Primary Examiner* — Raymond S Dean

(57) ABSTRACT

A method and system for controlling application of MU-MIMO. The disclosure provides for considering a device's power class as a basis to decide whether to provide the device with MU-MIMO service. For instance, a base station could determine which of the base station's served devices that are threshold distant from the base station are each a high power device rather than a lower power device. And on at least that basis, the base station could select each such device to receive MU-MIMO service. Or faced with a choice between devices to receive MU-MIMO service, the base station could compare the devices' power classes and could select the devices that have higher power class to receive MU-MIMO service.

18 Claims, 13 Drawing Sheets

(56) References Cited

U.S. PATENT DOCUMENTS

2019/0090199 A1* 3/2019 Kim .................... H04W 52/281
2019/0090259 A1* 3/2019 Oteri ................... H04B 7/0452
2019/0379435 A1* 12/2019 Kamath ............... H04W 40/04

OTHER PUBLICATIONS

X. Lu et al., "Dynamic User Grouping and Joint Resource Allocation With Multi-Cell Cooperation for Uplink Virtual MIMO Systems," IEEE Transactions on Wireless Communications (Mar. 2017).

* cited by examiner

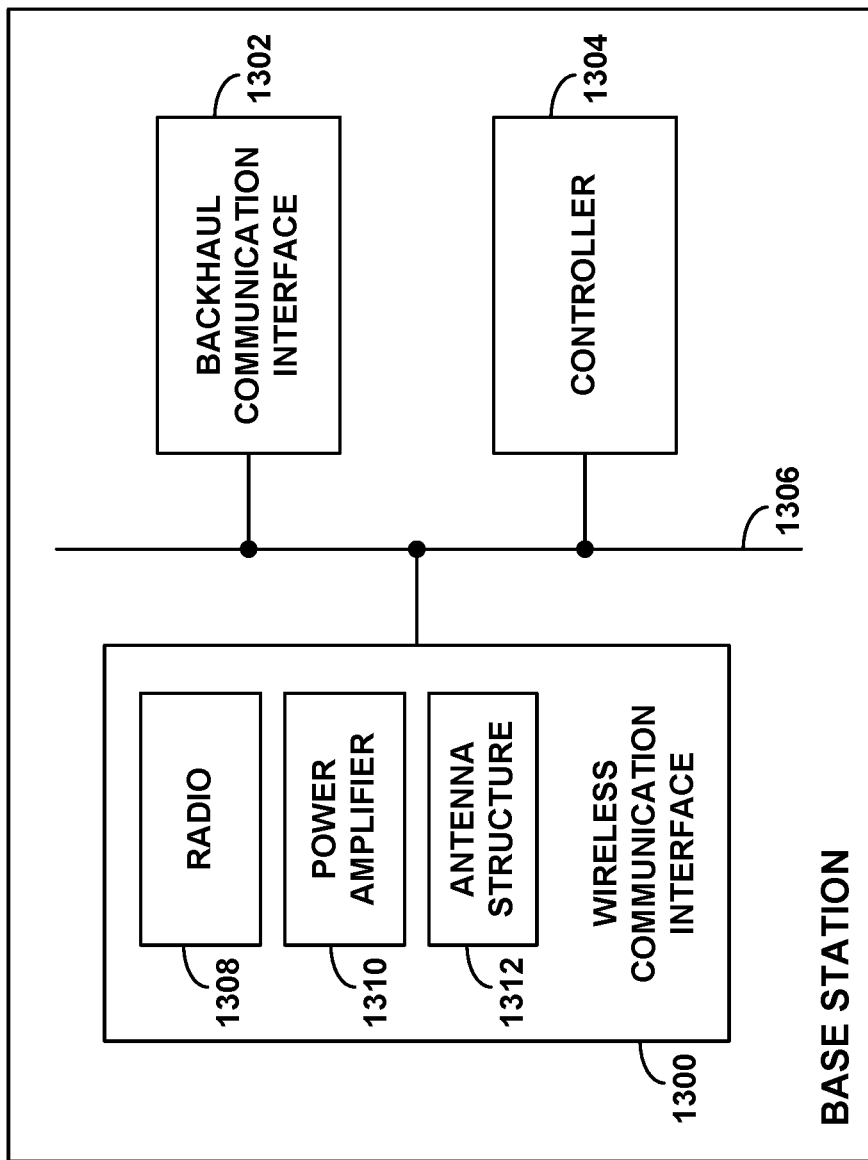

USE OF POWER CLASS AS BASIS TO CONTROL CONFIGURATION OF MU-MIMO SERVICE

BACKGROUND

A wireless communication system typically includes a number of base stations that are configured to provide wireless coverage areas, such as cells and cell sectors, in which user equipment devices (UEs) such as cell phones, tablet computers, tracking devices, embedded wireless modules, and other wirelessly equipped communication devices (whether or not user operated), can operate. In turn, each base station could be coupled with network infrastructure that provides connectivity with one or more transport networks, such as the public switched telephone network (PSTN) and/or the Internet for instance. With this arrangement, a UE within coverage of the system could engage in air interface communication with a base station and could thereby communicate via the base station with various remote network entities or with other UEs served by the base station.

Each coverage area in such a system could operate in accordance with a particular radio access technology, with air-interface communications from the base stations to UEs defining a downlink or forward link and air-interface communications from the UEs to the base stations defining an uplink or reverse link.

Over the years, the industry has embraced various "generations" of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive-MIMO, beamforming, and/or other features, to support higher data rates and countless applications, such as mission-critical services, enhanced mobile broadband, and massive Internet of Things (IoT).

In accordance with the radio access technology, each coverage area could operate on a carrier, which could be frequency division duplex (FDD), defining separate frequency channels for downlink and uplink communication, or time division duplex (TDD), with a single frequency channel multiplexed over time between downlink and uplink use. Further, on the downlink and uplink, the carrier could be structured to define various physical channels for carrying information between the base stations and UEs. For example, the air interface could be divided over time into frames, each divided in turn into subframes and timeslots, and the carrier bandwidth could be divided over frequency into subcarriers, which could be grouped within each timeslot to define physical resource blocks (PRBs) in which the subcarriers can be modulated to carry data.

The base station could then be configured to coordinate use of these air-interface resources on an as-needed basis. For example, when the base station has data to transmit to a UE, the base station could allocate particular downlink air-interface resources to carry that data and could accordingly transmit the data to the UE on the allocated downlink resources. And when a UE has data to transmit to the base station, the UE could transmit to the base station an uplink resource grant request, the base station could responsively allocate particular uplink air-interface resources to carry the data, and the UE could then transmit the data to the base station on the allocated uplink resources.

OVERVIEW

One of the key performance metrics of a wireless communication system is its spectral efficiency, namely, the extent of data that the system can carry per unit of frequency spectrum. The spectral efficiency of a wireless communication system or its base stations could be measured as a quantity of bits per Hertz.

If a wireless communication system has low spectral efficiency, a provider of the system may need to configure the system with additional licensed spectrum, such as wider carriers and/or more carriers, in order to accommodate subscriber communication needs. However, adding licensed spectrum could be costly and therefore undesirable.

One way to help improve spectral efficiency is to make use of MIMO technology.

With MIMO, a base station can engage in air interface communication concurrently on multiple different radio-frequency (RF) propagation paths, or MIMO "layers," with multiple layers occupying the same frequency resources (e.g., subcarriers and PRBs) as each other. To facilitate this, the base station could be equipped with a MIMO antenna array, comprising multiple transmit antennas and multiple receive antennas. By suitably weighting and precoding transmissions by particular antennas in the array, the base station can then output spatially separate but concurrent transmissions for receipt by its served UEs. Because these concurrent transmissions occupy the same frequency resources (e.g., subcarriers) as each other, MIMO can thereby support a greater extent of data communication per unit frequency, thereby increasing the base stations' spectral efficiency and possibly avoiding or deferring the need to add more spectrum.

MIMO service could be used in a "single-user MIMO" (SU-MIMO) configuration to increase the data rate of transmission to a single UE, by multiplexing communications to the UE onto multiple separate layers using the same air-interface resources as each other. For instance, when a base station has data to transmit to a UE, the base station could time-division-multiplex the data into multiple data streams, the base station could modulate the data streams onto the same PRBs as each other, and the base station could output the modulated data streams onto separate antenna ports for concurrent transmission on separate respective propagation paths to the UE. In practice, the UE could have two or more antennas, and the UE could estimate the channel distortion at each of its antennas and use the estimates to separately compute and uncover each of the base station's transmit signals.

Further, MIMO can also be used in a "multi-user MIMO" (MU-MIMO) configuration to increase the data capacity of the air interface by allowing communications to multiple UEs to use the same air-interface resources as each other. For instance, a base station can modulate data streams destined to each of multiple UEs on the same PRBs as each other and can transmit the modulated data streams on a separate respective propagation paths for receipt by the UEs. To facilitate this, the base station could pre-code transmissions on each propagation path using weighted coefficients based on channel estimates from the UEs, in a manner that enables each UE to remove cross-talk and receive its intended data. Further, the base station could beamform the transmissions respectively to each UE to help physically distinguish the transmissions from each other. In theory, MU-MIMO could thus increase the data capacity of the air interface by allowing a base station to serve more UEs at a time without requiring additional air-interface resources.

In dense urban markets and other areas, wireless service providers may face a need to provide an increased extent of MIMO service. In particular, in such areas, a provider may serve a great many UEs or may otherwise need to support high aggregate throughput, but the provider may have limited available spectrum, such as a limited number of PRBs per timeslot. To help overcome that limitation, the provider may equip its base stations with a massive-MIMO antenna array.

While a traditional MIMO antenna array may include on the order of 2 to 8 antennas, a massive-MIMO antenna array would include many more antennas, perhaps on the order of tens, hundreds, or even thousands of antennas. For instance, a representative massive-MIMO antenna array could include 128 antennas, of which 64 might be configured as transmit antennas and the other 64 might be configured as receive antennas. With this arrangement, if 4 transmit antennas are used per layer (e.g., to facilitate beamforming), the massive-MIMO antenna array might support on the order of 16 layers, to facilitate concurrent transmissions to up to 16 UEs (e.g., 8 UEs with 2 layers apiece, or 16 UEs with 1 layer apiece) or transmission to a single UE with up to 16 layers, among other possibilities.

When a base station serves many UEs at once, the base station could beneficially apply MU-MIMO in order to provide concurrent high-throughput transmissions to the UEs. For example, if the base station's air interface has 100 PRBs per timeslot and the base station has a massive-MIMO array as discussed above, then, with MU-MIMO, the base station could theoretically transmit concurrently to 8 UEs with 2 layers apiece on all 100 of those PRBs. Within one timeslot, each UE could thus theoretically receive two times the single-layer data capacity of those 100 PRBs. (By comparison, if instead of applying MU-MIMO, the base station were to apply just SU-MIMO with 2 layers apiece for each of those 8 UEs, then the base station might transmit to each UE with 2 layers on just about 12 PRBs, thus providing lower throughput.)

To facilitate MU-MIMO service, the UEs that will share air-interface resources (e.g., PRBs) should be "orthogonal" to each other, meaning that each UE could receive spatially separate transmissions from the base station without undue interference from the base station's transmissions to each other UE. Thus, when a base station is going to apply MU-MIMO (perhaps in response to the base station being heavily loaded with connected UEs with high throughput requirements), the base station could select a group of UEs to be a MU-MIMO group based on the UEs being orthogonal to each other. The base station could deem the UEs of a group to be sufficiently orthogonal to each other if each UE has reported threshold high signal-to-noise-plus-interference ratio (SINR), and/or if the UEs are located at positions that are physically separate enough from each other that the base station's RF transmission paths to the UEs would have sufficient angular separation, among other possibilities.

Further, given that the base station may support only up to a limited quantity of MIMO layers (e.g., just 16 layers in the example above), the base station may need to decide which UEs to provide with MU-MIMO service. For instance, if the base station is going to provide just 8 UEs with MU-MIMO service using 2 layers per UE, and if the base station is serving well more than 8 UEs, the base station may need to decide which 8 UEs to provide with MU-MIMO service (in addition to deciding how to group the UEs, based on their orthogonality).

Optimally, when a base station selects UEs to receive MU-MIMO service, the base station could select the UEs in a manner that will help achieve one or more specific technological goals. For instance, the base station could select UEs based on a determination that the selected UEs would contribute substantially to the base station's overall spectral efficiency—in an effort to avoid or defer the need to configure the base station with costly additional spectrum. Further, the base station could select UEs based on a consideration of a determination that MU-MIMO service would be especially helpful depending on the UEs' operational states.

In one respect, for example, the base station could select a UE to receive MU-MIMO service based on the selected UE having threshold low block error rate (BLER) (e.g., not having threshold high BLER). BLER represents accuracy of data received by the UE, perhaps as a ratio between the number of erroneous transport blocks (e.g., with failed cyclic redundancy check) that the UE has received from the base station and the total number of transport blocks that the UE has received from the base station. UEs that have low BLER could successfully receive more data in a given quantity of air-interface resources, which could help improve the base station's overall spectral efficiency.

Thus, in an example implementation, the base station could determine which of the base station's served UEs each have threshold low BLER (e.g., do not have threshold high BLER), and the base station could select those UEs to receive MU-MIMO service. Or faced with a choice between UEs, the base station could compare the UEs' levels of BLER and could select the UEs that have lower BLER to receive MU-MIMO service.

In another respect, the base station could select a UE to receive MU-MIMO service based on the selected UE having low power headroom. Power headroom represents the difference between the UE's currently set uplink transmission power and the UE's maximum allowed uplink transmission power. In practice, when a UE has low power headroom, that could mean that the UE's current uplink transmission power is high, which—for a battery powered UE—could mean that the UE's battery level is low or may soon become low. In that situation, it could be useful for the base station to provide the UE with MU-MIMO service, since MU-MIMO service could enable higher throughput downlink transmission to the UE, possibly allowing the UE to receive a given quantity of data more quickly and with less overall battery power consumption.

Thus, in an example implementation, the base station could determine which of the base station's served UEs each have threshold low power headroom and could select those UEs to receive MU-MIMO service. Or faced with a choice between UEs, the base station could compare the UEs' levels of power headroom and could select the UEs that have lower power headroom to receive MU-MIMO service.

In yet another respect, if the base station is faced with a choice between UEs that are all threshold distant from the base station, the base station could select a UE to receive MU-MIMO service based on the selected UE being a high power UE (HPUE) rather than a standard power UE (SPUE). An HPUE can transmit with higher maximum power than a standard power UE and may use that higher maximum transmission power when located relatively far from the base station. As between an HPUE and an SPUE that are similarly situated, the HPUE may be more likely than the SPUE to engage in successful uplink communication to the base station. Thus, upon receipt of downlink transmission from the base station, the HPUE may be more likely than the SPUE to successfully communicate a positive acknowledgement to the base station, which could again contribute to higher overall spectral efficiency.

Thus, in an example implementation, the base station could determine which of the base station's served UEs are HPUEs versus SPUEs and could select the UEs to receive MU-MIMO service based on the UEs being HPUEs rather than SPUEs. Further, the base station could apply this process specifically in a scenario where the UEs at issue are each threshold distant from the base station, such as where the UEs have relatively high transmission signal delay, and/or threshold distant geographic location.

In still another respect, the base station could select a UE to receive MU-MIMO service based on the selected UE being stationary rather than moving, or based on the UE being relatively stationary. If a UE is moving and receiving MU-MIMO service, the base station may need to regularly adjust the direction of one or more RF beams on which the base station transmits to the UE, and possible errors in those adjustments could give rise to failed communications, which would negatively impact spectral efficiency. Whereas, if the UE is stationary, the base station may be able to more reliably transmit to the UE, which could contribute to higher spectral efficiency.

Thus, in an example implementation, the base station could determine which of the base station's served UEs are stationary rather than moving and could select those UEs to receive MU-MIMO service. Or faced with a choice between UEs that are all moving, the base station could determine which UEs are moving the least (e.g., at the slowest speed) and could select those UEs to receive MU-MIMO service.

Further, in yet another respect, the base station could select a UE to receive MU-MIMO service based on the selected UE having relatively stable RF conditions rather than relatively fluctuating RF conditions. Here, the analysis could be focused on the reported downlink RF conditions (e.g., reported reference signal receive power (RSRP), reported reference signal receive quality (RSRQ), and/or reported channel quality indicator (CQI)) and/or determined uplink RF conditions (e.g., uplink sounding reference signal (SRS) strength or quality)). If a UE has highly fluctuating RF conditions, then there could be great uncertainty as to whether the UE will be able to successfully receive transmissions from the base station and whether the UE will be able to successfully acknowledge those transmissions, and therefore providing such a UE with MU-MIMO service may be less certain to help improve spectral efficiency. Whereas if a UE has relatively stable (and sufficiently high quality) RF conditions, then successful downlink and uplink communications with the UE may be more certain, and providing the UE with MU-MIMO service may be more certain to help improve spectral efficiency.

Thus, in an example implementation, the base station could determine which of the base station's served UEs have relatively stable RF conditions and could select those UEs to receive MU-MIMO service. Or faced with a choice between UEs, the base station could compare the levels of stability of the UEs' RF conditions and could select for MU-MIMO service the UEs that have most stable RF conditions.

These as well as other aspects, advantages, and alternatives will become apparent to those of ordinary skill in the art by reading the following detailed description, with reference where appropriate to the accompanying drawings.

Further, it should be understood that the descriptions provided in this overview and below are intended to illustrate aspects by way of example only and not by way of limitation.

BRIEF DESCRIPTION OF THE DRAWINGS

FIG. 13 is a simplified block diagram of a base station operable in accordance with the disclosure.

DETAILED DESCRIPTION

Figure 1:
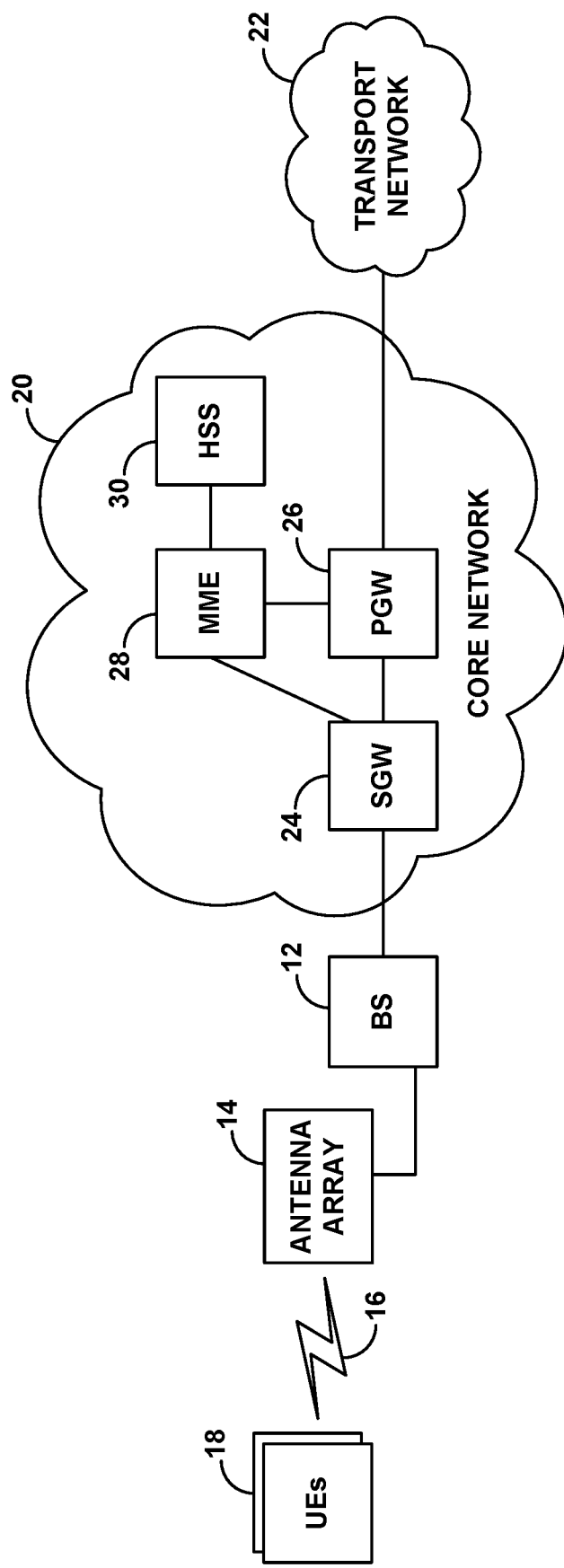
FIG. 1 is a simplified block diagram of a network arrangement in which aspects of the present disclosure can be implemented.

Referring to the drawings, as noted above, FIG. 1 is a simplified block diagram of an example wireless communication system in which various disclosed features can be implemented. It should be understood, however, that numerous variations from this and other disclosed arrangements and operations are possible. For example, elements or operations could be added, removed, combined, distributed, re-ordered, or otherwise modified. In addition, operations described as being performed by one or more entities could be implemented in various ways, such as by a processor executing instructions stored in non-transitory data storage, along with associated circuitry or other hardware, for instance.

As shown in FIG. 1, the example wireless communication system includes a representative base station 12 having an antenna array 14 through which the base station is configured to provide coverage 16 on one or more carriers in one or more frequency bands. Shown operating within coverage of the base station are then a plurality of UEs 18, which could be devices of the type discussed above, among other possibilities.

The base station could be a macro base station of the type configured to provide a wide range of coverage, and the antenna array could be mounted on a tower or other tall structure. Alternatively, the base station could take other forms, such as a small cell base station, a repeater, a femtocell base station, or the like, which might be configured to provide a smaller range of coverage. The base station could be configured to operate according to a 4G, 5G, or other radio access technology. For instance, the base station could be an LTE evolved Node-B (eNB) or a 5GNR gigabit Node-B (gNB), among other possibilities.

The base station is shown coupled with a core network 20, which could be an enhanced packet core (EPC) network, next generation core (NGC) network, or another network including components supporting an applicable radio access technology and providing connectivity with at least one transport network 22, such as the Internet.

In an example implementation as shown, the core network 20 includes a serving gateway (SGW) 24, a packet data network gateway (PGW) 26, a mobility management entity (MME) 28, and a home subscriber server (HSS) 30. In particular, the base station has an interface with the SGW, the SGW has an interface with the PGW, and the PGW provides connectivity with the transport network. Further, the base station has an interface with the MME, and the MME has an interface with the SGW and the HSS.

With this arrangement, the SGW and PGW cooperatively provide user-plane connectivity between the base station and the transport network, to enable a UE served by the base station to engage in communication on the transport network. And the MME operates as a controller to carry out operations such as coordinating UE attachment and setup of user-plane bearers. Further, the HSS includes or has access to a data store containing UE capabilities and service profile data and can work with the MME to facilitate UE authentication.

As discussed above, the air interface between the base station and UEs within its coverage could be structured to define various air interface resources.

For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the base station operates could be divided into subcarriers with specified subcarrier spacing on the order of 15 to 240 kHz. With this arrangement, the air interface on each carrier would define an array of resource elements each occupying a subcarrier and symbol time segment, and the base station and UEs could communicate with each other through modulation of the subcarriers to carry data in those resource elements. Variations of this arrangement are possible as well.

Further, particular groupings of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the base station to UEs. And other resource elements per subframe could be reserved to define a shared channel in which PRBs could carry scheduled data communications from the base station to UEs.

Further, in certain subframes, a group of resource elements centered on the center frequency of each carrier could be reserved to carry synchronization signals that UEs could detect as a way to discover coverage of the base station on the carrier and to establish frame timing. And in certain subframes, a group of resource elements also centered on the center frequency of the carrier could be reserved to define a broadcast-channel for carrying system information messages, such as master information block (MIB) and system information block (SIB) messages that WCDs could read to obtain operational parameters such as carrier bandwidth and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the base station. And other resource elements per subframe could be reserved to define a shared channel in which PRBs could carry scheduled data communications from UEs to the base station. Further, still other resources on the uplink could be reserved for other purposes as well, such as for carrying uplink reference signals or the like.

In operation, when a UE enters into coverage of the base station on a carrier, the UE could detect the base station's synchronization signal and could then read the base station's MIB or the like to determine the carrier's bandwidth. The UE could then engage in random access signaling and Radio Resource Control (RRC) configuration signaling with the base station to connect with the base station on the carrier, thus putting the UE in an RRC-connected mode.

Once the UE is connected with the base station, the UE could then transmit to the base station an attach request, which the base station could forward to the MME for processing. And after working with the HSS to authenticate the UE, the MME could coordinate setup for the UE of one or more user-plane bearers between the base station and the PGW, to enable the UE to engage in communication on the transport network. Further, the base station could establish for the UE a context record indicating operational state of the UE, and the base station could receive from the UE and/or the HSS (via the MME) a set of capabilities and profile data for the UE and could store that data in the context record for reference while serving the UE.

The base station could then serve the UE with data communications.

For instance, when data arrives at the base station for transmission to the UE, the base station could allocate one or more downlink PRBs in a subframe for use to transmit at least a portion of the data, defining a transport block, to the UE. The base station could then transmit to the UE in the control region of that subframe a Downlink Control Information (DCI) message that designates the PRBs, and the base station could accordingly transmit the transport block to the UE in those designated PRBs.

For each such downlink transmission, the UE could then determine if the UE received transport block successfully. For instance, the transmission could carry a cyclic redundancy check (CRC) value computed based on the transport block, and the UE could compute a CRC based on the received transport block and determine whether its computed CRC matches that carried by the transmission. If the UE receives the transmission and determines that the CRC matches or otherwise that the UE received the transport block successfully, then the UE could transmit to the base station a positive acknowledgement (ACK) control message, and the base station could then proceed with transmission of a next transport block (if any) to the UE. Whereas, if the UE did not receive the transmission or determined that the CRC did not match and thus that there was an error in the received transport block, then the UE could transmit to the base station a negative acknowledgement (NACK), in response to which the base station could attempt the transmission again.

On the other hand, when the UE has data to transmit to the base station (e.g., for transmission on the transport network), the UE could transmit to the base station a scheduling request that carries with it a buffer status report (BSR) indicating how much data the UE has buffered for transmission. And in response the base station, could allocate one or more uplink PRBs in an upcoming subframe for carrying a transport block of that data from the UE and could transmit to the UE a DCI message that designates those upcoming PRBs. The UE could then accordingly transmit the transport block to the base station in the designated PRBs.

As with downlink transmission, for each transport block that the UE transmits to the base station, the base station could determine if the transport block arrived successfully, based on a CRC analysis for instance. And if the base station received the transmission successfully, then the base station could transmit to the UE an ACK and could schedule a next uplink transmission from the UE. Whereas, if the base station did not receive the transmission successfully, then the base station could transmit to the UE a NACK, and the UE could attempt retransmission to the base station.

While the base station is so serving a connected UE, the UE could also transmit various operational information to the base station to assist with the base station's allocation of PRBs and other service of the UE.

For example, the UE could regularly evaluate the quality of its air interface connection with the base station, such as based on reference-signal receive strength and/or quality (e.g., SINR) and could periodically transmit to the base station a channel-quality-indicator (CQI) value that represents the UE's determined level of channel quality. When the base station is going to allocate PRBs to carry data to or from the UE, the base station could then map the UE's most recent reported CQI to an applicable modulation and coding scheme (MCS) that defines how much error-correction-coding to include with the transmission and what modulation scheme to use for modulating the data onto resource elements. Based on this analysis and on the quantity of PRBs to be allocated, the base station could thus determine what size transport block of data could be carried, and the base station could allocate those PRBs for carrying that transport block.

As another example, the UE could transmit to the base station a power headroom report (PHR), indicating the UE's current power headroom, which as noted above could be the difference between the UE's currently set transmission power and the UE's maximum transmission power. A UE's power headroom could vary over time, as a result of the UE adjusting its transmission power. For instance, the UE and base station could engage in a power-control process to dynamically increase or decrease the UE's transmission power based on the strength of UE transmissions received by the base station. Thus, the UE's transmission power could vary from time to time and the UE's power headroom could also vary accordingly.

The UE could transmit its PHR to the base station within a scheduling request that the UE sends to the base station to request allocation of air interface resources for uplink transmission by the UE. And the base station could use the UE's reported power headroom as a further basis for PRB allocation, such as in deciding how many PRBs to allocate for the UE per subframe.

In practice, the base station may serve multiple connected UEs at a time, and the base station may face a need to schedule data transmissions concurrently to multiple such UEs and/or from multiple such UEs. Because the base station's air interface has just a finite, limited number of PRBs per unit time (e.g., per subframe), the base station could implement a scheduling algorithm in an effort to fairly and appropriately allocate the PRBs among the base station's served UEs.

Yet as noted above, the base station may still face load issues. For instance, there could be times when the base station is serving many connected UEs at once and faces a need to schedule data transmissions to many such UEs at once, but the base station does not have sufficient PRBs per unit time to adequately meet the throughput needs of the UEs.

As noted above, the base station could use MIMO to help overcome this problem. In particular, the base station could apply MU-MIMO to facilitate serving multiple UEs at once on the same PRBs as each other and may thereby be able to provide the multiple UEs with a desired level of throughput while also achieving improved spectral efficiency. As further noted above, one way to provide such MIMO service is with use of a massive-MIMO antenna array. Thus, in an example implementation, the base station's antenna array 14 could be a massive-MIMO array.

Figure 2:
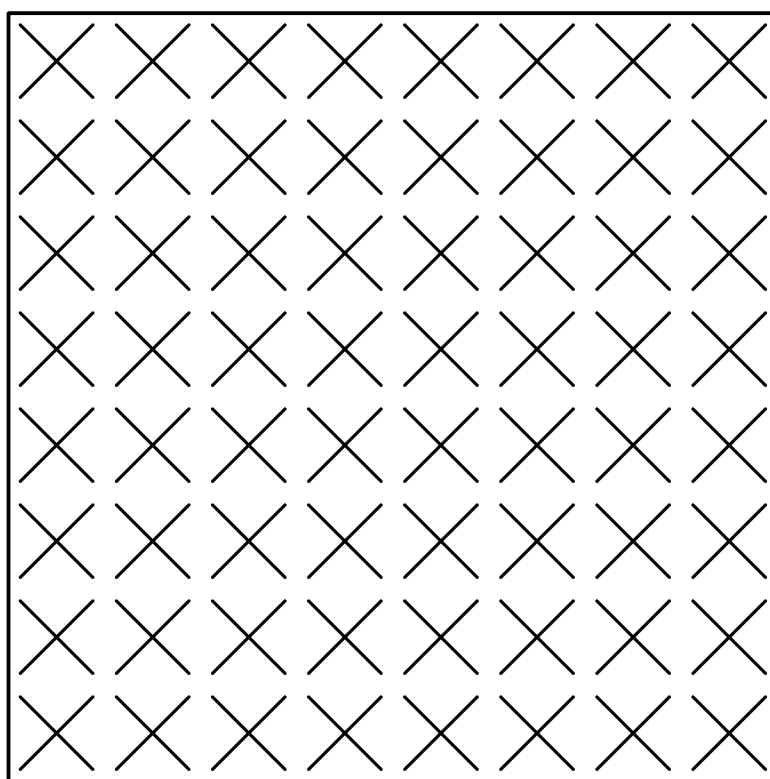
FIG. 2 is a simplified diagram of an example massive-MIMO antenna array that could be implemented according to the disclosure.

FIG. 2 is a simplified diagram of an example massive-MIMO array that could be implemented at base station 12. In this illustration, each X represents two antennas (or antenna elements), one with positive polarization and one with negative polarization. As a result, each column in the example array includes eight antennas with positive polarization and eight antennas with negative polarization. As there are eight columns of antennas, the massive-MIMO array thus has a total of 128 antennas. In a representative implementation, 64 of these antennas could be configured as transmit (downlink) antennas, and the other 64 could be configured as receive (uplink) antennas. For instance, all of the antennas with positive polarization could be configured as transmit antennas, and all of the antennas with negative polarization could be configured as receive antennas.

As discussed above, with this massive-MIMO antenna array, the base station may be able to provide 16 layers of MIMO transmission. For instance, for each layer, the base station could use 4 of its transmit antennas to provide beamformed transmission defining a respective MIMO layer. Thus, the base station could in theory transmit with up to 16 layers on a common set of air interface resources (e.g., PRBs). Other MIMO arrangements are possible as well.

As noted, the base station could transmit individual MIMO layers to UEs, by beamforming and/or pre-coding the transmissions. For example, the base station could beamform transmissions to an individual UE by evaluating angle of arrival of uplink signals (e.g., an uplink sounding-reference-signal) from the UE or determining geolocation of the UE, and setting phase and amplitude of downlink transmission from various antenna elements so as to direct the transmission toward the UE. Further, the base station could pre-code individual transmissions to a UE to help the UE distinguish those transmissions from others and extract the transmissions from a combination of received downlink signals. For instance, the base station could transmit one or more downlink modulation reference signals (DMRSs) that the UE can receive and evaluate in order to establish and report channel estimates, and the base station could use those channel estimates as a basis to pre-code transmissions with weighted coefficients that enable the UE to receive and uncover the transmissions.

Assuming sufficient orthogonality between UEs of a group, the base station could thus transmit to the UEs of the group on the same PRBs as each other, i.e., at the same time and on the same subcarriers as each other. The transmissions to the UEs would occupy the same PRBs as each other, but would be distinguished from each other through beamforming, pre-coding, and/or one or more other mechanisms.

Thus, in each downlink subframe, the base station could allocate a given set of PRBs to each of multiple UEs of a MU-MIMO group and could provide downlink transmission on the allocated PRB(s) respectively to each UE of the MU-MIMO group, using one or more MIMO layers respectively for each UE.

The base station could thus theoretically allocate all of the PRBs of a subframe to the MU-MIMO group, so that each UE of the MU-MIMO group can receive data transmissions on one or more MIMO layers within all of those PRBs. Alternatively, the base station might allocate some of the PRBs of the subframe to a first MU-MIMO group of UEs and transmit to those UEs with MIMO layers on those PRBs, and the base station might allocate other PRBs of the subframe to a second MU-MIMO group of UEs and transmit to those UEs with MIMO layers on those PRBs. Further, the base station might allocate some PRBs of the subframe for use without MIMO or in other ways.

To configure MU-MIMO service for a UE, the base station may engage in signaling with the UE to obtain channel estimates and precoding information, and the base station may work with the UE through DCI signaling to prepare the UE for receipt of beamformed and pre-coded transmissions or the like.

As discussed above, at issue in this process could be which UEs the base station should provide with MU-MIMO service, i.e., which UEs the base station should include in MU-MIMO group(s) that the base station will establish. The base station may face this issue when the base station is heavily loaded, such as with a threshold high number of connected UEs, and when the served UEs could benefit from MU-MIMO service. Given that the base station can support only up to a finite number of MIMO layers at once (e.g., only up to 16 MIMO layers in the example discussed above), if the base station is serving many connected UEs that could benefit from MU-MIMO service, the base station may need to decide which of those UEs to provide with MU-MIMO service. More particularly, as to a representative served UE, the base station may need to decide whether or not to provide that UE with MU-MIMO service.

In practice, the base station could address this question per downlink subframe. For instance, in anticipation of each downlink subframe, the base station could determine for which of its connected-mode UEs the base station has data buffered for downlink transmission, how soon the data needs to be transmitted, and how many UEs are at issue. Further, the base station could consider its air-interface capacity in the subframe, such as how many PRBs are available for the base station to allocate in the subframe. And based on these and/or other factors, the base station could determine that applying MU-MIMO for transmission in the subframe could be helpful, and the base station could then work to determine which of the UEs should receive the MU-MIMO service.

The question of which UEs to provide with MU-MIMO service is related to but separate from the question of how to group the UEs that the base station will provide with MU-MIMO service. As noted above, grouping of UEs for MU-MIMO service on the same shared PRBs could require the UEs to be orthogonal to each other. But regardless of which MU-MIMO group a UE would be included in, at issue here is whether the base station should provide the UE with MU-MIMO service.

As noted above, the base station could take into account various factors as a basis to decide which of the base station's served UEs to provide with MU-MIMO service, or to decide whether to provide a given served UE with MU-MIMO service. Further, the base station could take into account combinations of such factors as a basis to make these decisions.

Selecting UEs for MU-MIMO Service Based on BLER

One factor that the base station could consider as a basis to decide whether to provide a UE with MU-MIMO service is BLER with respect to data received by the UE, since low BLER represents more successful data transmission per air-interface resource, which could contribute to higher spectral efficiency. Thus, as noted above, the base station could determine which of the base station's served UEs each have threshold low BLER (e.g., which UEs do not have threshold high BLER). And on at least that basis, the base station could select those UEs to receive MU-MIMO service. Or faced with a choice between UEs, the base station could compare the UEs' levels of BLER and could select the UEs that have lower BLER to receive MU-MIMO service.

To enable the base station to best evaluate BLER experienced by its served UEs, each UE could be configured to track its own BLER and to report its BLER to the base station or to another network entity (e.g., an element management system) from which the base station could obtain the UE's BLER data. For instance, each UE could track its BLER as a rate of erroneous transport blocks that the UE has received per unit time, possibly over a recent sliding window or otherwise rolled up over time. And the UE could report its BLER periodically or in response to one or more other triggers, within a dedicated signaling message or in a field of another message. The base station could thus keep track of reported BLER on a per-UE basis, perhaps recording each UE's latest reported BLER in a UE context record or the like.

When the base station is considering which of the base station's served UEs should receive MU-MIMO service, the base station could then refer to that reported BLER data to determine which UEs have BLER lower than a predefined threshold level, with the threshold being set by engineering design or otherwise to represent a level where MU-MIMO service may contribute adequately to spectral efficiency. If the base station thus determines that a UE's BLER is threshold low (e.g., not threshold high), then based on at least that factor, the base station could select the UE to receive MU-MIMO service. Whereas, if the base station determines that the UE's BLER is not threshold low (e.g., is threshold high), then, based on at least that factor, the base station could decide to not provide that UE with MU-MIMO service.

Alternatively or additionally, the base station could perform a comparison between BLER of its various served UEs and could determine based on that comparison whether a UE should receive MU-MIMO service or which UE(s) should receive MU-MIMO service. For instance, the base station could compare the BLER of a first served UE with the BLER of a second served UE. And based at least on a determination that the first UE's BLER is lower (perhaps threshold lower)

than the second UE's BLER, the base station could select the first UE rather than the second UE to receive MU-MIMO service.

On the other hand, having all connected UEs regularly report their BLER to the base station could unfortunately bog down the air interface, as each such report could itself consume uplink air interface resources. To avoid this problem, the base station could direct some or all of its served UEs to report their BLER to the base station only when their BLER is threshold high, and the base station could then exclude from consideration for receiving MU-MIMO service any UE that has recently enough reported that it has a threshold high BLER. The base station could then assume that each UE that has not recently enough reported having threshold high BLER does not have threshold high BLER (e.g., has threshold low BLER), and on at least that basis the base station could select each such UE to receive MU-MIMO service.

The base station could direct some or all of its UEs in various ways to report threshold-high BLER. For instance, the base station's served UEs might normally operate in a mode in which they do not report their BLER to the base station. But the base station could broadcast a system message to which its served UEs will respond by transitioning to a mode in which they will report their BLER to the base station when their BLER becomes threshold high, i.e., responsive to their BLER becoming threshold high. For example, the base station could include in a SIB message a bit or other value to which the UEs are configured to respond by transitioning to that mode. Further, the base station could specify in the broadcast message a BLER threshold that the UEs are to consider for this purpose, or the UEs could be configured in advance with an indication of that threshold.

Alternatively, the base station could configure individual UEs to provide such threshold-high-BLER reports. For instance, the base station could transmit to each such UE an RRC connection reconfiguration message or other unicast message that directs the UE to report its BLER when the BLER becomes threshold high, and the base station could also specify in that message an applicable BLER threshold.

Given that MU-MIMO would be especially useful when the base station is heavily loaded, this reconfiguration of the base station's served UEs to operate in a mode when they would report threshold-high BLER could be done in response to the base station being heavily loaded. For instance, the base station could detect that the base station is heavily loaded (e.g., serving a threshold great number of UEs, having high PRB occupancy, or otherwise as discussed above). And in response, the base station could then direct its served UEs to report to the base station if and when they have threshold high BLER.

Further, the act of a UE reporting to the base station that the UE has threshold high BLER could involve the UE reporting its BLER as an index value or other BLER value and the base station deeming that reported BLER to be threshold high. Alternatively, if the UE will report only when the UE has threshold high BLER, then the UE's report could more simply be a Boolean flag or other value indicative of the UE having threshold high BLER.

Figure 3:
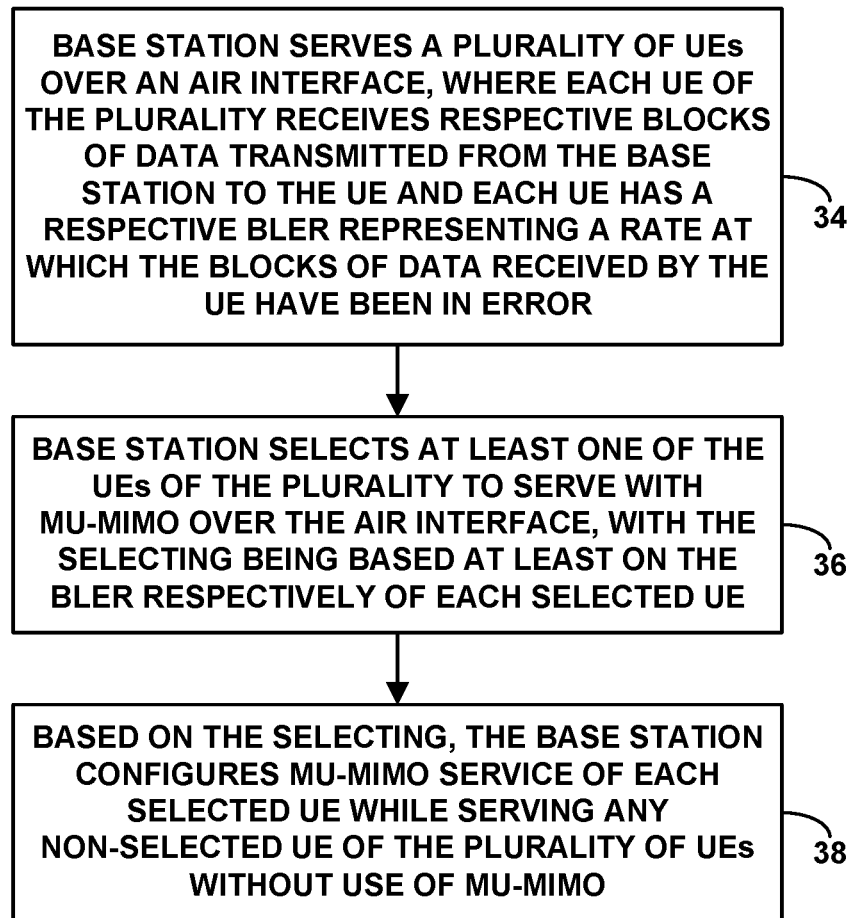
FIG. 3 is a flow chart depicting operations that can be carried out in accordance with the disclosure.

FIG. 3 is a flow chart depicting operations that can be carried out in accordance with this disclosure, to control transmission over an air interface in a wireless communication system. As shown in FIG. 3, at block 34, the operations includes a base station serving a plurality of UEs over the air interface, where each UE of the plurality receives respective blocks of data transmitted from the base station to the UE and each UE has a respective BLER representing a rate at which the blocks of data received by the UE have been in error. At block 36, the operations include the base station selecting at least one of the UEs of the plurality to serve with MU-MIMO over the air interface, with the selecting being based at least on the BLER respectively of each selected UE. And at block 38, the operations include, based on the selecting, the base station configuring MU-MIMO service of each selected UE while serving any non-selected UE (e.g., each other UE) of the plurality of UEs without use of MU-MIMO.

In line with the discussion above, the operations could additionally include receiving respectively from each UE of the plurality a report of the BLER of the UE, such as receiving the report directly from the UE or receiving the report from a network entity to which the UE reported the BLER of the UE. Further, the reported BLER of each UE could be based on failed a CRC of one or more of the blocks of data received by the UE.

In addition, as discussed above, the act of selecting at least one of the UEs of the plurality to serve with MU-MIMO over the air interface with the selecting being based at least on the BLER respectively of each selected UE could involve, for each UE of the plurality (i) making a determination of whether the BLER of the UE is lower than a predefined threshold level, (ii) if the determination is that the BLER of the UE is lower than the predefined threshold level, then, based at least on the determination, selecting the UE to serve with MU-MIMO over the air interface, and (iii) if the determination is that the BLER of the UE is not lower than the predefined level threshold, then, based at least on the determination, not selecting the UE to serve with MU-MIMO over the air interface.

Further, the act of selecting at least one of the UEs of the plurality to serve with MU-MIMO over the air interface with the selecting being based at least on the BLER respectively of each selected UE could involve (i) comparing the BLER of a first one of the UEs of the plurality with the BLER of a second one of the UEs of the plurality, (ii) based on the comparing, determining that the BLER of the first UE is lower than the BLER of the second UE, and (iii) based on the determining, selecting the first UE rather than the second UE to receive MU-MIMO service over the air interface.

Still additionally, as discussed above, the operations could include the base station directing the UEs of the plurality to operate in a mode in which each UE of the plurality will report the UE's BLER to the base station if and when the BLER of the UE is threshold high, and after so directing the UEs, the base station treating each UE of the plurality that does not report threshold high BLER as being a UE that has threshold low BLER, for purpose of deciding whether to select the UE to serve with MU-IMO over the air interface.

For instance, the base station could broadcast a directive to which each UE of the plurality is configured to respond by transitioning from not operating in the mode to operating in the mode and/or unicasting to each UE of the plurality a directive to which the UE is configured to respond by transitioning from not operating in the mode to operating in the mode. Further, the directing could be done in response to determining that the base station is heavily loaded.

Yet additionally, as discussed above, the operations could include the base station including each selected UE in a MU-MIMO group of UEs based on a further determination that the selected UE is orthogonal to each other UE of the MU-MIMO group.

And still further, as discussed above, the act of the base station configuring MU-MIMO service of each selected UE could involve the base station causing air interface transmission between the base station and the selected UE to occupy same time-frequency air interface resources (e.g., PRBs) as air interface transmission between the base station and another UE of plurality. Whereas, the act of the base station serving each other UE of the plurality of UEs without use of MU-MIMO could involve the base station causing air interface transmission between the base station and each other UE to occupy different time-frequency air interface resources than air interface transmission between the base station and any other UE of the plurality.

Figure 4:
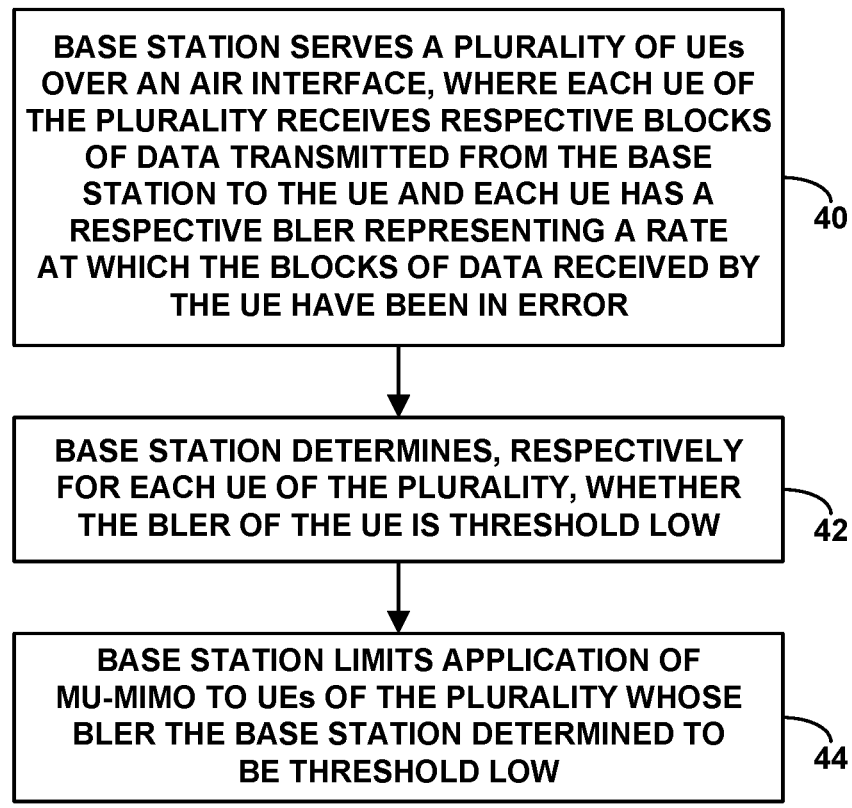
FIG. 4 is another flow chart depicting operations that can be carried out in accordance with the disclosure.

FIG. 4 is another flow chart depicting operations that can be carried out in accordance with this disclosure, to control transmission over an air interface in a wireless communication system. As shown in FIG. 4, at block 40, the operations include a base station serving a plurality of UEs over the air interface, where each UE of the plurality receives respective blocks of data transmitted from the base station to the UE and each UE has a respective BLER representing a rate at which the blocks of data received by the UE have been in error. At block 42, the operations include the base station determining, respectively for each UE of the plurality, whether the BLER of the UE is threshold low. And at block 44, the operations include the base station limiting application of MU-MIMO to UEs of the plurality whose BLER the base station determined to be threshold low.

In line with the discussion above, the operations could additionally include the base station causing each UE of the plurality to operate in a mode in which the UE will report when BLER of the UE is threshold high. For instance, the base station could do this in response to a determination the base station is threshold loaded. And the act of determining for a UE of the plurality that BLER of the UE is threshold low could involve determining that the base station has not received from the UE a report indicating that the BLER of the UE is threshold high.

Further, as discussed above, the act of the base station limiting application of MU-MIMO to UEs of the plurality whose BLER the base station determined to be threshold low could involve (i) the base station selecting at least a first UE of the plurality to receive MU-MIMO service, where the selecting is based at least on the BLER of the first UE being at least as low as a predefined threshold level and (ii) the base station rejecting application of MU-MIMO service for at least a second UE of the plurality, i.e., excluding the second UE from receiving MU-MIMO service, where the rejecting is based at least on the BLER of the second UE not being at least as low as the predefined threshold level.

Selecting UEs for MU-MIMO Service Based on Power Headroom

Another factor that the base station could consider as a basis to decide whether to provide a UE with MU-MIMO service is power headroom of the UE, since low power headroom could suggest that the UE is operating with relatively high transmission power, which could in turn suggest that the UE's battery level (if applicable) is being depleted more than it might otherwise be.

As discussed above, providing a UE with MU-MIMO service might help the UE to complete downlink transmission quicker than it otherwise would, which might be useful when a UE is faced with possibly low or relatively quickly-depleting battery energy. Thus, as noted above, the base station could determine which of the base station's served UEs each have threshold low power headroom (e.g., which UEs do not have threshold high power headroom). And on at least that basis, the base station could select those UEs to receive MU-MIMO service. Or faced with a choice between UEs, the base station could compare the UEs' levels of power headroom, and the base station could select the UEs that have lower power headroom to receive MU-MIMO service.

To enable the base station to use a UE's power headroom as a basis to decide whether to provide the UE with MU-MIMO service, the base station could keep track of the UE's latest reported power headroom. For instance, when the UE reports provides the base station with a PHR indicating the UE's power headroom, the base station could record that power headroom in a UE context record or the like.

When the base station is considering which UEs should receive MU-MIMO service, the base station could refer to that reported power-headroom data to determine which UEs have power headroom lower than a predefined threshold level, with the threshold being set by engineering design or otherwise as a level that may suggest likely fast battery-energy depletion. If the base station thus determines that a UE's power headroom is threshold low (e.g., not threshold high), then based on at least that factor, the base station could select the UE to receive MU-MIMO service. Whereas, if the base station determines that the UE's power headroom is not threshold low (e.g., is threshold high), then, based on at least that factor, the base station could decide to not provide that UE with MU-MIMO service.

Alternatively or additionally, the base station could perform a comparison between power headroom of its various served UEs and could determine based on that comparison whether a UE should receive MU-MIMO service or which UE(s) should receive MU-MIMO service. For instance, the base station could compare the power headroom of a first served UE with the power headroom of a second served UE. And based at least on a determination that the first UE's power headroom is lower (perhaps threshold lower) than the second UE's power headroom, the base station could select the first UE rather than the second UE to receive MU-MIMO service.

Figure 5:
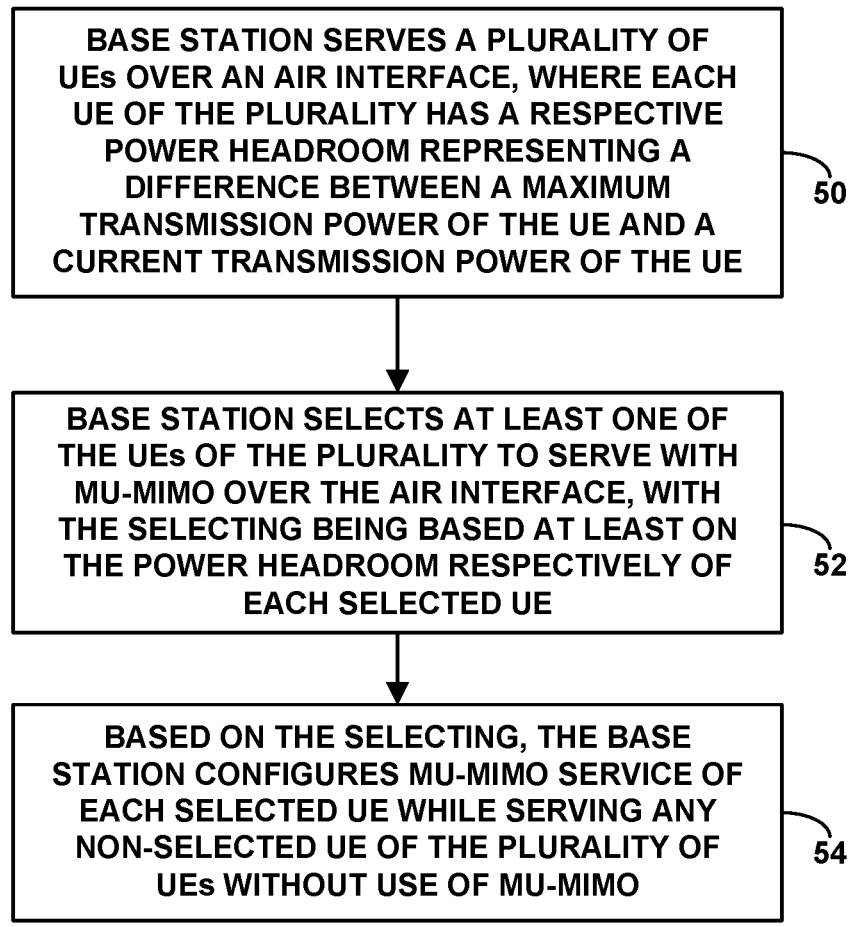
FIG. 5 is another flow chart depicting operations that can be carried out in accordance with the disclosure.

FIG. 5 is a flow chart depicting operations that can be carried out in accordance with this disclosure, to control transmission over an air interface in a wireless communication system. As shown in FIG. 5, at block 50, the operations includes a base station serving a plurality of UEs over the air interface, where each UE of the plurality has a respective power headroom representing a difference between a maximum transmission power of the UE and a current transmission power of the UE. At block 52, the operations include the base station selecting at least one of the UEs of the plurality to serve with MU-MIMO over the air interface, with the selecting being based at least on the power headroom respectively of each selected UE. And at block 54, the operations include, based on the selecting, the base station configuring MU-MIMO service of each selected UE while serving any non-selected UE (e.g., each other UE) of the plurality of UEs without use of MU-MIMO.

In line with the discussion above, the operations could additionally include receiving respectively from each UE the plurality a report of the power headroom of the UE. For instance, the base station could receive such a report within a scheduling request from the UE.

In addition, as discussed above, the act of selecting at least one of the UEs of the plurality to serve with MU-MIMO over the air interface with the selecting being based at least on the power headroom respectively of each selected UE could involve, for each UE of the plurality (i) making a determination of whether the power headroom of the UE is lower than a predefined threshold level, (ii) if the determination is that the power headroom of the UE is lower than the predefined threshold level, then, based at least on the determination, selecting the UE to serve with MU-MIMO over the air interface, and (iii) if the determination is that the power headroom of the UE is not lower than the predefined level threshold, then, based at least on the determination, not selecting the UE to serve with MU-MIMO over the air interface.

Further, the act of selecting at least one of the UEs of the plurality to serve with MU-MIMO over the air interface with the selecting being based at least on the power headroom respectively of each selected UE could involve (i) comparing the power headroom of a first one of the UEs of the plurality with the power headroom of a second one of the UEs of the plurality, (ii) based on the comparing, determining that the power headroom of the first UE is lower than the power headroom of the second UE, and (iii) based on the determining, selecting the first UE rather than the second UE to receive MU-MIMO service over the air interface.

Still additionally, as discussed above, the operations could comprise including each selected UE in a MU-MIMO group of UEs based on a further determination that the selected UE is orthogonal to each other UE of the MU-MIMO group.

And still further, as discussed above, the act of the base station configuring MU-MIMO service of each selected UE could involve the base station causing air interface transmission between the base station and the selected UE to occupy same time-frequency air interface resources (e.g., PRBs) as air interface transmission between the base station and another UE of plurality. Whereas, the act of the base station serving each other UE of the plurality of UEs without use of MU-MIMO could involve the base station causing air interface transmission between the base station and each other UE to occupy different time-frequency air interface resources than air interface transmission between the base station and any other UE of the plurality.

Figure 6:
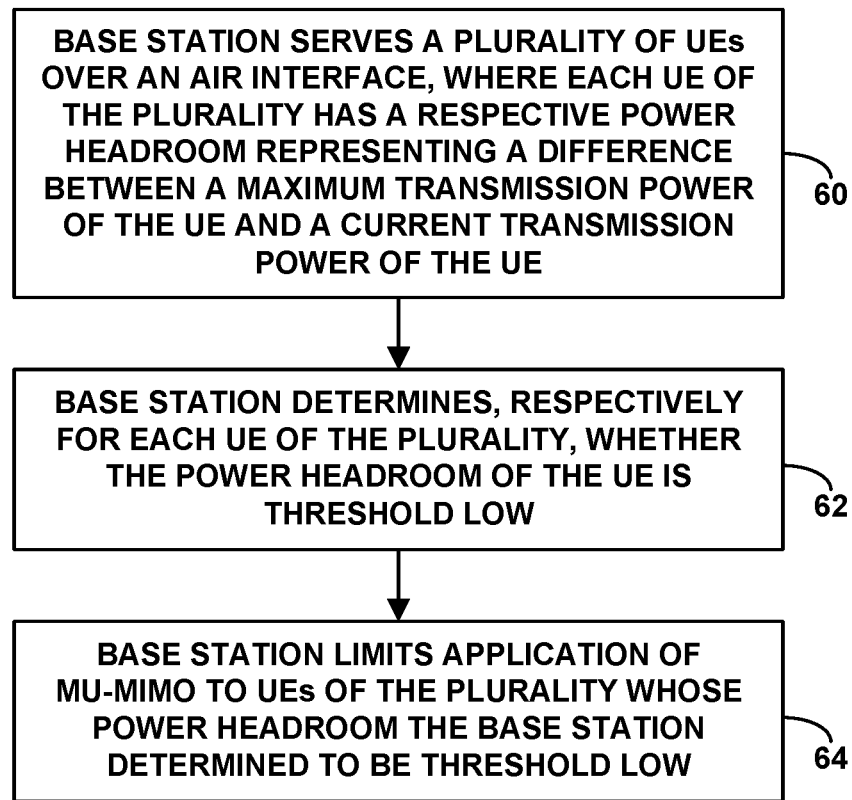
FIG. 6 is another flow chart depicting operations that can be carried out in accordance with the disclosure.

FIG. 6 is another flow chart depicting operations that can be carried out in accordance with this disclosure, to control transmission over an air interface in a wireless communication system. As shown in FIG. 6, at block 60, the operations include a base station serving a plurality of UEs over the air interface, where each UE of the plurality has a respective power headroom representing a difference between a maximum transmission power of the UE and a current transmission power of the UE. At block 62, the operations include the base station determining, respectively for each UE of the plurality, whether the power headroom of the UE is threshold low. And at block 64, the operations include the base station limiting application of MU-MIMO to UEs of the plurality whose power headroom the base station determined to be threshold low.

In line with the discussion above, the operations could additionally include receiving respectively from each UE the plurality a report of the power headroom of the UE. Here again, for instance, the base station could receive such a report within a scheduling request from the UE. And the operations could include the base station grouping UEs of the plurality into a MU-MIMO group based on a determination that the UEs of the MU-MIMO group are orthogonal to each other.

Further, the act of the base station limiting application of MU-MIMO to UEs of the plurality whose power headroom the base station determined to be threshold low could involve (i) the base station selecting at least a first UE of the plurality to receive MU-MIMO service, wherein the selecting is based at least on the power headroom of the first UE being at least as low as a predefined threshold level, and (ii) rejecting by the base station application of MU-MIMO service for at least a second UE of the plurality, wherein the rejecting is based at least on the power headroom of the second UE not being at least as low as the predefined threshold level.

Selecting UEs for MU-MIMO Service Based on Power Class

Another factor that the base station could consider as a basis to decide whether to provide a UE with MU-MIMO service is power class of the UE, such as whether the UE is an HPUE or rather an SPUE, since UEs that can transmit with higher power may be better able to successfully acknowledge transmissions from the base station, which could contribute to higher spectral efficiency.

Industry standards or governmental regulations may define UE power classes, and UEs could be characterized by their manufacturing specifications or other data to be a member of one power class or another. For instance, standards may define SPUEs as UEs that are limited to operating with up to a maximum transmission power of 23 decibel-milliwatts (dBm) (about 0.2 Watts) and HPUEs as UEs that are limited to operating with up to a maximum transmission power of 26 dBm (about 0.4 Watts) or more on certain carrier frequencies. With the ability to operate at up to a higher maximum transmission power, an HPUE may therefore be better able than an SPUE to transmit successfully to the base station from a distance or with RF obstructions.

Thus, as noted above, the base station could determine which of the base station's served UEs have a high power class rather than a low power class, such as which of the base station's served UEs are HPUEs rather than SPUEs. And based on at least that factor, the base station could select those UEs to receive MU-MIMO service. Or faced with a choice between UEs, the base station could compare the UEs' power classes and could select the UEs that have a higher power class to receive MU-MIMO service.

For instance, the base station could determine whether a UE is a HPUE or is rather an SPUE. And if the base station determines that the UE is an HPUE rather than an SPUE, then, based on at least that determination, the base station could decide to provide the UE with MU-MIMO service. Whereas, if the base station determines that the UE is an SPUE rather than an HPUE, then, based on at that determination, the base station could decide to not provide the UE with MU-MIMO service.

Further, because UEs are most likely to use their maximum transmission power when the UEs are located far away from the base station, the base station's consideration of UE power class as a basis to decide whether to provide the UE with MU-MIMO service could be specifically for UEs that are located at least a threshold far away from the base station. For instance, the base station could determine which of its served UEs are located at least a predefined threshold distance from the base station, and the base station could consider power classes of those determined UEs, as a basis to determine which if any of those UEs to provide with MU-MIMO service.

In an example implementation, the base station could determine the power class of a served UE by referring to the UE's profile (e.g., capabilities) data, as obtained from the HSS and/or from the UE during attachment or at another time. That data could specify the UE's power class in a manner interpretable and understandable by the base station, at least for the present purpose. For instance, if the UE is an SPUE, the data could specify the UE's power class by a first value, whereas if the UE is an HPUE, the data could specify the UE's power class by a second value.

Further, the base station could determine the distance of a served UE from the base station in various ways. For instance, the base station could estimate the UE's distance based on evaluation of signal delay for transmission between the UE and the base station. Alternatively, the base station, the UE, and/or one or more other entities could determine the UE's geographic location through trilateration, using satellite-positioning, or in another manner, and the base station could compare that location with the base station's geographic location, to determine how far the UE is from the base station. Still alternatively, the base station could use UE reports of signal strength from one or more neighboring base stations as a way to estimate the UE's location given network coverage maps, and the base station could similarly compute the UE's distance.

Thus, when the base station is considering which UEs should receive MU-MIMO service, the base station could identify a subset (one or more) of the base station's served UEs based on their each being positioned at least a predefined threshold distance from the base station, and the base station could determine for each such UE whether the UE is an HPUE or rather an SPUE. If the base station thereby determines that a threshold distant UE is an HPUE rather than an SPUE, then, based at least on that determination, the base station could decide to provide that distant UE with MU-MIMO service. Whereas, if the base station thereby determines that a threshold distant UE is an SPUE rather than an HPUE, then, based at least on that determination, the base station could decide to not provide that distant UE with MU-MIMO service.

Alternatively or additionally, the base station could perform a comparison between power classes of various ones of its served UEs, such as those UEs deemed to be threshold distant from the base station, and the base station could decide based at least on that comparison which UEs should receive MU-MIMO service and/or which UEs should not receive MU-MIMO service. For instance, given first and second served UEs that are located threshold far from the base station, the base station could select the first UE to receive MU-MIMO service based on the first UE having a higher power class (e.g., higher maximum transmission power) than the second UE, and the base station could decide to not serve the second UE with MU-MIMO based on the second UE having a lower power class than the first UE.

Figure 7:
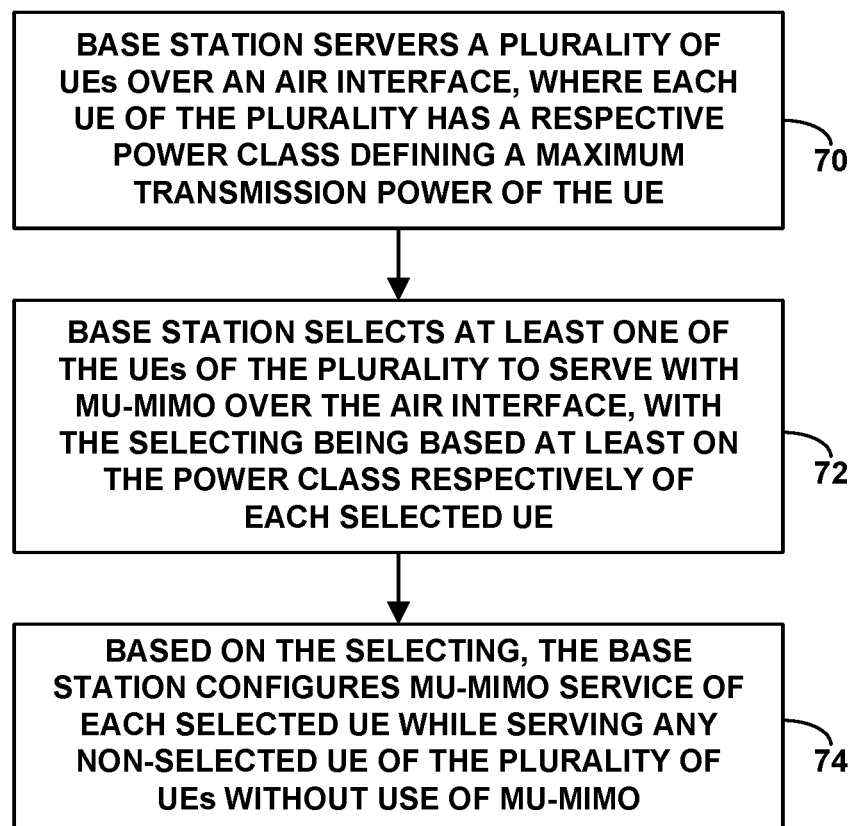
FIG. 7 is another flow chart depicting operations that can be carried out in accordance with the disclosure.

FIG. 7 is a flow chart depicting operations that can be carried out in accordance with this disclosure, to control transmission over an air interface in a wireless communication system. As shown in FIG. 7, at block 70, the operations includes a base station serving a plurality of UEs over the air interface, where each UE of the plurality has a respective power class defining a maximum transmission power of the UE. At block 72, the operations include the base station selecting at least one of the UEs of the plurality to serve with MU-MIMO over the air interface, with the selecting being based at least on the power class respectively of each selected UE. And at block 74, the operations include, based on the selecting, the base station configuring MU-MIMO service of each selected UE while serving any non-selected UE (e.g., each other UE) of the plurality of UEs without use of MU-MIMO.

In line with the discussion above, the operations could additionally include the base station determining, respectively for each UE the plurality, the power class of the UE. For instance, the base station could determine the power class of each UE by reference to profile data of the UE.

Further, as discussed above, the power class of each UE could be a standard power class defining a first maximum transmission power or a high power class defining a second maximum transmission power higher than the first maximum transmission power, among other possibilities. For instance, each UE could be an SPUE or an HPUE, among other possibilities. And the act of selecting at least one of the UEs based at least on the power class respectively of each selected UE could involve selecting the UE based at least in part on the UE having the high power class (e.g., being an HPUE) rather than the standard power class (e.g., being an SPUE).

As further discussed above, the act of selecting at least one of the UEs of the plurality to serve with MU-MIMO over the air interface with the selecting being based at least on the power class respectively of each selected UE could then involve, for each UE of the plurality (i) making a determination of whether the power class of the UE is lower than a predefined threshold level, (ii) if the determination is that the power class of the UE is the high power class rather than the low power class, then, based at least on the determination, selecting the UE to serve with MU-MIMO over the air interface, and (iii) if the determination is that the power class of the UE is the standard power class rather than the high power class, then, based at least on the determination, not selecting the UE to serve with MU-MIMO over the air interface.

Further, the act of selecting at least one of the UEs of the plurality to serve with MU-MIMO over the air interface with the selecting being based at least on the power class respectively of each selected UE could involve (i) comparing the power class of a first one of the UEs of the plurality with the power class of a second one of the UEs of the plurality, (ii) based on the comparing, determining that the power class of the first UE is higher than the power class of the second UE, and (iii) based on the determining, selecting the first UE rather than the second UE to receive MU-MIMO service over the air interface.

Still additionally, as discussed above, this process could be focused on UEs that are threshold distant from the base station. Thus, the operations could additionally include the base station initially identifying the plurality of UEs based on each UE of the plurality of UEs being located at least a predefined threshold distance from the base station.

Further, the operations could comprise including each selected UE in a MU-MIMO group of UEs based on a further determination that the selected UE is orthogonal to each other UE of the MU-MIMO group.

And still further, as discussed above, the act of the base station configuring MU-MIMO service of each selected UE could involve the base station causing air interface transmission between the base station and the selected UE to occupy same time-frequency air interface resources (e.g., PRBs) as air interface transmission between the base station and another UE of plurality. Whereas, the act of the base station serving each other UE of the plurality of UEs without use of MU-MIMO could involve the base station causing air interface transmission between the base station and each other UE to occupy different time-frequency air interface resources than air interface transmission between the base station and any other UE of the plurality.

Figure 8:
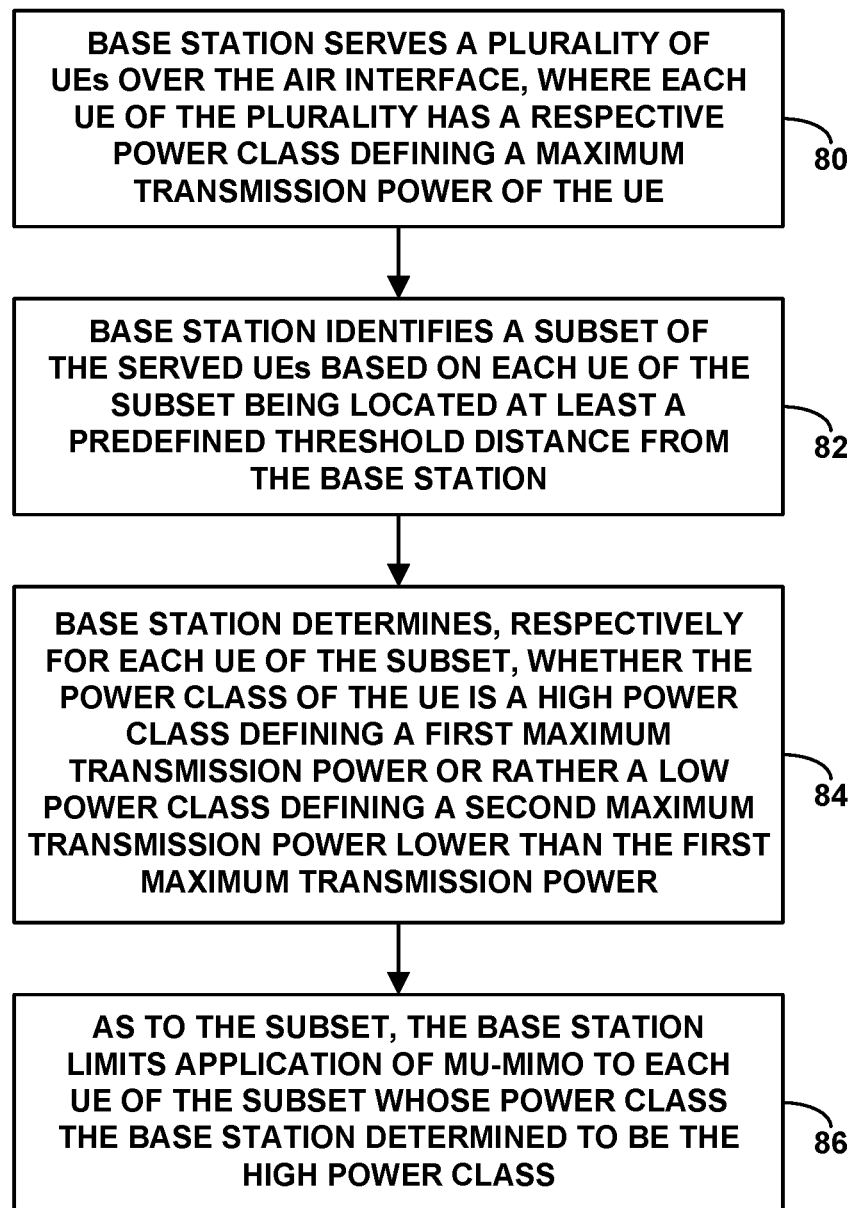
FIG. 8 is another flow chart depicting operations that can be carried out in accordance with the disclosure.

FIG. 8 is another flow chart depicting operations that can be carried out in accordance with this disclosure, to control transmission over an air interface in a wireless communication system. As shown in FIG. 8, at block 80, the operations include a base station serving a plurality of UEs over the air interface, where each UE of the plurality has a respective power class defining a maximum transmission power of the UE. At block 82, the operations include the base station identifying a subset (one or more) of the served UEs based on each UE of the subset being located at least a predefined threshold distance from the base station.

At block 84, the operations include the base station determining, respectively for each UE of the subset, whether the power class of the UE is a high power class defining a first maximum transmission power or rather a low power class defining a second maximum transmission power lower than the first maximum transmission power. And at block 86, the operations include, as to the subset, the base station limiting application of MU-MIMO to each UE of the subset whose power class the base station determined to be the high power class.

In line with the discussion above, the operations could additionally include the base station determining, respectively for each UE of the subset, the power class of the UE, such as by reference to profile data of the UE.

Further, as discussed above, the act of the base station limiting application of MU-MIMO to each UE of the subset whose power class the base station determined to be the high power class could involve, for a given UE of the subset, (i) if the determined power class of the UE is the high power class rather than the standard power class, then, based at least on the determination, configuring MU-MIMO service of the UE and (ii) if the determination is that the power class of the UE is the standard power class rather than the high power class, then, based at least on the determination, not configuring MU-MIMO service of the UE.

And still further, the operations could include the base station grouping UEs of the plurality into a MU-MIMO group based on a determination that the UEs of the MU-MIMO group are orthogonal to each other.

Selecting UEs for MU-MIMO Service Based on Mobility

Another factor that the base station could consider as a basis to decide whether to provide a UE with MU-MIMO service is whether the UE is stationary rather than moving, or whether the UE is sufficiently stationary. In particular, as noted above, the base station could select a UE to receive MU-MIMO service based on the selected UE being stationary rather than moving, or based on the UE being relatively stationary, as the stationary nature of the UE might make it easier for the base station to more reliably beamform to the UE, which could help improve spectral efficiency.

Thus, the base station could determine which of the base station's served UEs are stationary rather than moving, or which of the base station's served UEs are moving less than a predefined extent, and, based on at least that factor, could select those UEs to receive MU-MIMO service. Or faced with a choice between UEs that are all moving, the base station could determine which UEs are moving the least and, based on at least that factor, could select those UEs to receive MU-MIMO service.

To facilitate this analysis, the base station could determine in various ways the speed of movement of each of the base station's served UEs. For instance, the base station could repeatedly estimate the UE's distance from the base station based on evaluation of signal delay of transmission between the UE and the base station, and the base station could track the rate of change of that distance as an indication of the UE's speed of movement. Alternatively, the base station, the UE, and/or one or more other entities could repeatedly determine the UE's geographic location through trilateration, using satellite-positioning, or in another manner, and the base station could track the rate of change of that position as an indication of the UE's speed of movement. Still alternatively, the base station could receive from the UE or another entity an indication of the UE's speed of movement or could otherwise determine the UE's speed of movement. Further, the base station could record each UE's speed of movement in a UE context record of the like.

When the base station is considering which of the base station's served UEs should receive MU-MIMO service, the base station could then refer to its information about each UE's respective speed of movement, and the base station could determine which of the UEs are moving less than a predefined threshold, with the threshold being set by engineering design or otherwise to represent a level where MU-MIMO service could be reliably established. If the base station determines that a UE's speed of movement is threshold low (e.g., not threshold high), then, based at least on that factor, the base station could select the UE to receive MU-MIMO service. Whereas, if the base station determines that the UE's speed of movement is not threshold low (e.g., is threshold high), then, based at least on that factor, the base station could decide to not provide that UE with MU-MIMO service.

Alternatively or additionally, the base station could perform a comparison between speed of movement of its various served UEs and could determine based on that comparison whether a UE should receive MU-MIMO service or which UE(s) should receive MU-MIMO service. For instance, the base station could compare the speed of movement of a first served UE with the speed of movement of a second served UE. And based at least on a determination that the first UE's speed of movement is lower (perhaps threshold lower) than the second UE's speed of movement, the base station could select the first UE rather than the second UE to receive MU-MIMO service.

Figure 9:
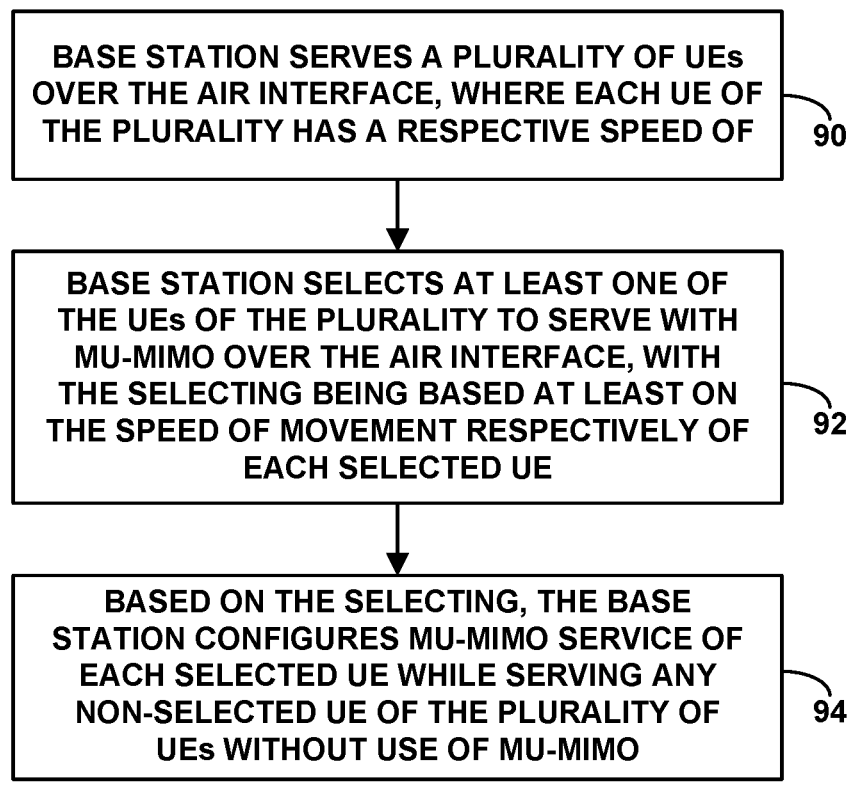
FIG. 9 is another flow chart depicting operations that can be carried out in accordance with the disclosure.

FIG. 9 is a flow chart depicting operations that can be carried out in accordance with this disclosure, to control transmission over an air interface in a wireless communication system. As shown in FIG. 9, at block 90, the operations includes a base station serving a plurality of UEs over the air interface, where each UE of the plurality has a respective speed of movement (zero if stationary, or non-zero if moving). At block 92, the operations include the base station selecting at least one of the UEs of the plurality to serve with MU-MIMO over the air interface, with the selecting being based at least on the speed of movement respectively of each selected UE. And at block 94, the operations include, based on the selecting, the base station configuring MU-MIMO service of each selected UE while serving any non-selected UE (e.g., each other UE) of the plurality of UEs without use of MU-MIMO.

In line with the discussion above, the operations could additionally include determining (e.g., estimating) respectively for each UE the plurality the speed of movement of the UE. For instance, the base station could determine the speed of movement of the UE based on change in signal delay of transmission between the UE and the base station or otherwise as discussed above.

In addition, as discussed above, the act of selecting at least one of the UEs of the plurality to serve with MU-MIMO over the air interface with the selecting being based at least on the speed of movement respectively of each selected UE could involve, for each UE of the plurality (i) making a determination of whether the speed of movement of the UE is lower than a predefined threshold level, (ii) if the determination is that the speed of movement of the UE is lower than the predefined threshold level, then, based at least on the determination, selecting the UE to serve with MU-MIMO over the air interface, and (iii) if the determination is that the speed of movement of the UE is not lower than the predefined level threshold, then, based at least on the determination, not selecting the UE to serve with MU-MIMO over the air interface.

Further, the act of selecting at least one of the UEs of the plurality to serve with MU-MIMO over the air interface with the selecting being based at least on the speed of movement respectively of each selected UE could involve (i) comparing the speed of movement of a first one of the UEs of the plurality with the speed of movement of a second one of the UEs of the plurality, (ii) based on the comparing, determining that the speed of movement of the first UE is lower than the speed of movement of the second UE, and (iii) based on the determining, selecting the first UE rather than the second UE to receive MU-MIMO service over the air interface.

Still additionally, as discussed above, the operations could comprise including each selected UE in a MU-MIMO group of UEs based on a further determination that the selected UE is orthogonal to each other UE of the MU-MIMO group.

And still further, as discussed above, the act of the base station configuring MU-MIMO service of each selected UE could involve the base station causing air interface transmission between the base station and the selected UE to occupy same time-frequency air interface resources (e.g., PRBs) as air interface transmission between the base station and another UE of plurality. Whereas, the act of the base station serving each other UE of the plurality of UEs without use of MU-MIMO could involve the base station causing air interface transmission between the base station and each other UE to occupy different time-frequency air interface resources than air interface transmission between the base station and any other UE of the plurality.

Figure 10:
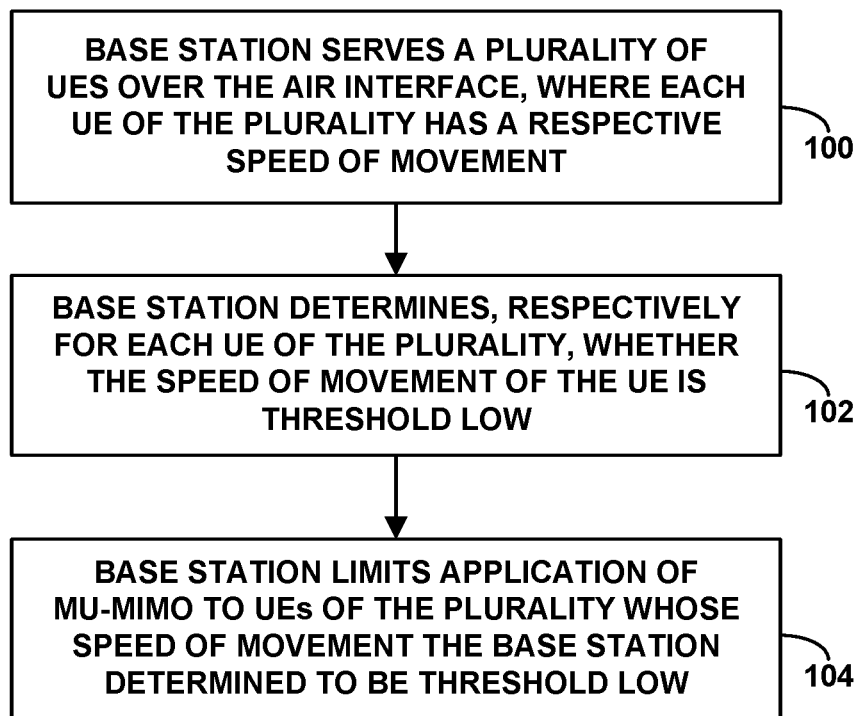
FIG. 10 is another flow chart depicting operations that can be carried out in accordance with the disclosure.

FIG. 10 is another flow chart depicting operations that can be carried out in accordance with this disclosure, to control transmission over an air interface in a wireless communication system. As shown in FIG. 10, at block 100, the operations include a base station serving a plurality of UEs over the air interface, where each UE of the plurality has a respective speed of movement. At block 102, the operations include the base station determining, respectively for each UE of the plurality, whether the speed of movement of the UE is threshold low. And at block 104, the operations include the base station limiting application of MU-MIMO to UEs of the plurality whose speed of movement the base station determined to be threshold low.

In line with the discussion above, the operations could additionally include determining respectively for each UE the plurality the speed of movement of the UE. Here again, for instance, the base station could determine the UE's speed of movement in various ways as discussed above.

Further, the act of the base station limiting application of MU-MIMO to UEs of the plurality whose speed of movement the base station determined to be threshold low could involve (i) the base station selecting at least a first UE of the plurality to receive MU-MIMO service, wherein the selecting is based at least on the speed of movement of the first UE being at least as low as a predefined threshold level, and (ii) rejecting by the base station application of MU-MIMO service for at least a second UE of the plurality, wherein the rejecting is based at least on the speed of movement of the second UE not being at least as low as the predefined threshold level.

Selecting UEs for MU-MIMO Service Based on Stability of RF Conditions

Another factor that the base station could consider as a basis to decide whether to provide a UE with MU-MIMO service is whether the UE's RF conditions are relatively stable rather than relatively fluctuating, or whether the UE's RF conditions are sufficiently stable. In particular, as noted above, the base station could select a UE to receive MU-MIMO service based on the selected UE having relatively stable RF conditions rather than having relatively fluctuating RF conditions, as stable RF conditions could suggest increased certainty of successful communications between the base station and the UE, which could help increase spectral efficiency.

Note that the term "RF conditions" could refer to one or more metrics related to RF communication between the base station and UE. Examples of such metrics include CQI, SINR, RSRP, and RSRQ, BLER, and/or retransmission rate, among other possibilities.

Thus, the base station could determine which of the base station's served UEs have relatively stable RF conditions rather than relatively fluctuating RF conditions, and, based on at least that factor, could select those UEs to receive MU-MIMO service. Or faced with a choice between UEs, the base station could determine which UEs have the most stable RF conditions and, based at least on that factor, the base station could select those UEs to receive MU-MIMO service.

To facilitate this analysis, the base station could determine in various ways the level of stability of RF conditions respectively of each of the base station's served UEs. For instance, the base station could gauge the level of stability of the UE's RF conditions based on the rate of change of one or more metrics such as those noted above, with a higher rate of change corresponding with lower stability and vice versa.

In particular, the base station could determine a rate of change respectively of one or more such metrics respectively for each UE of the plurality. Considering one such metric, the base station could determine a rate of change of the metric and could use that rate of change as a basis to determine whether to provide the UE with MU-MIMO service. Or considering multiple such metrics, the base station could determine a rate of change respectively of each metric and could compute an average, weighted average, or other representation of a rate of change of the group of metrics, and the base station could consider that rate of change as a basis to determine whether to provide the UE with MU-MIMO service.

For instance, for each UE, the base station could keep track of the UE's reported CQI, RSRP, RSRQ, or SINR, and/or the base station could keep track of the base station's rate of retransmission to the UE (e.g., responsive to NACKs from the UE) and/or one or more other metrics. And the base station could regularly compute for each UE a rate of change of one or more such metrics, over a sliding window of time for instance. Further, the base station could store an associated indication of each UE's rate of change of RF conditions in a UE context record or the like.

When the base station is considering which of the base station's served UEs should receive MU-MIMO service, the base station could then refer to its information about each UE's respective rate of change of RF conditions, and the base station could determine which of the UEs have a rate of change of RF conditions lower than a predefined threshold, with the threshold being set by engineering design or otherwise to represent a level where MU-MIMO service may contribute adequately to spectral efficiency. If the base station determines that a UE's rate of change of RF conditions is threshold low (e.g., not threshold high), then, based at least on that factor, the base station could select the UE to receive MU-MIMO service. Whereas, if the base station determines that the UE's rate of change of RF conditions is not threshold low (e.g., is threshold high), then, based at least on that factor, the base station could decide to not provide that UE with MU-MIMO service.

Alternatively or additionally, the base station could perform a comparison between rate of change of RF conditions of its various served UEs and could determine based on that comparison whether a UE should receive MU-MIMO service or which UE(s) should receive MU-MIMO service. For instance, the base station could compare the rate of change of RF conditions of a first served UE with the rate of change of RF conditions of a second served UE. And based at least on a determination that the first UE's rate of change of RF conditions is lower (perhaps threshold lower) than the second UE's rate of change of RF conditions, the base station could select the first UE rather than the second UE to receive MU-MIMO service.

Figure 11:
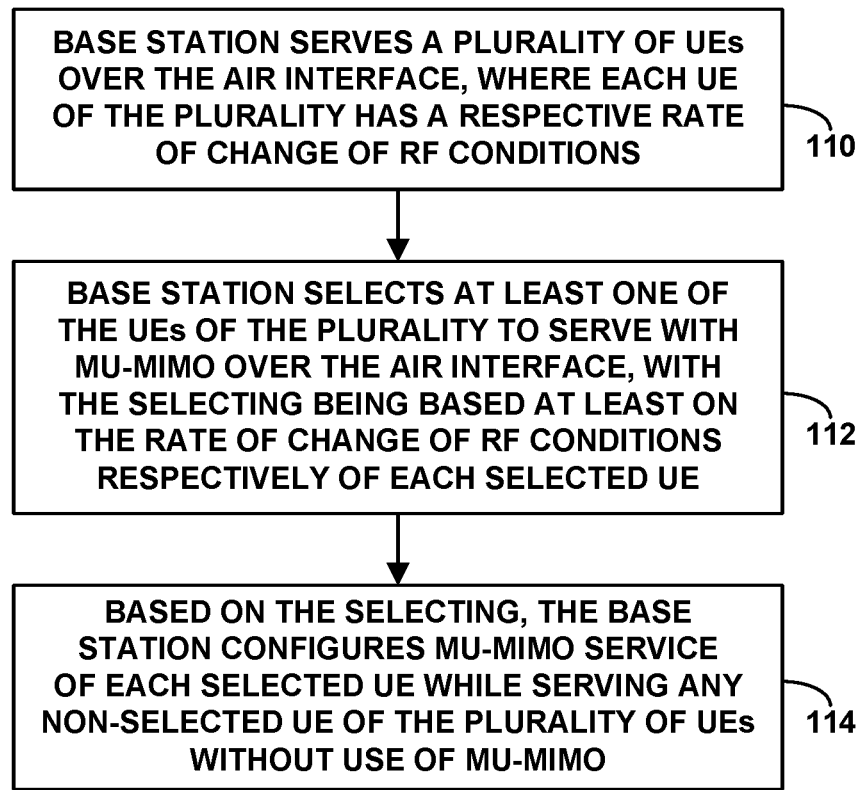
FIG. 11 is another flow chart depicting operations that can be carried out in accordance with the disclosure.

FIG. 11 is a flow chart depicting operations that can be carried out in accordance with this disclosure, to control transmission over an air interface in a wireless communication system. As shown in FIG. 11, at block 110, the operations includes a base station serving a plurality of UEs over the air interface, where each UE of the plurality has a respective rate of change of RF conditions (which could be zero if the UE's RF conditions are unchanging). At block 112, the operations include the base station selecting at least one of the UEs of the plurality to serve with MU-MIMO over the air interface, with the selecting being based at least on the rate of change of RF conditions respectively of each selected UE. And at block 114, the operations include, based on the selecting, the base station configuring MU-MIMO service of each selected UE while serving any non-selected UE (e.g., each other UE) of the plurality of UEs without use of MU-MIMO.

In line with the discussion above, the operations could additionally include determining (e.g., estimating) respectively for each UE the plurality the rate of change of RF conditions of the UE. For instance, the base station could determine the rate of change of RF conditions of the UE based on one or more of the metrics noted above.

In addition, as discussed above, the act of selecting at least one of the UEs of the plurality to serve with MU-MIMO over the air interface with the selecting being based at least on the rate of change of RF conditions respectively of each selected UE could involve, for each UE of the plurality (i) making a determination of whether the rate of change of RF conditions of the UE is lower than a predefined threshold level, (ii) if the determination is that the rate of change of RF conditions of the UE is lower than the predefined threshold level, then, based at least on the determination, selecting the UE to serve with MU-MIMO over the air interface, and (iii) if the determination is that the rate of change of RF conditions of the UE is not lower than the predefined level threshold, then, based at least on the determination, not selecting the UE to serve with MU-MIMO over the air interface.

Further, the act of selecting at least one of the UEs of the plurality to serve with MU-MIMO over the air interface with the selecting being based at least on the rate of change of RF conditions respectively of each selected UE could involve (i) comparing the rate of change of RF conditions of a first one of the UEs of the plurality with the rate of change of RF conditions of a second one of the UEs of the plurality, (ii) based on the comparing, determining that the rate of change of RF conditions of the first UE is lower than the rate of change of RF conditions of the second UE, and (iii) based on the determining, selecting the first UE rather than the second UE to receive MU-MIMO service over the air interface.

Still additionally, as discussed above, the operations could comprise including each selected UE in a MU-MIMO group of UEs based on a further determination that the selected UE is orthogonal to each other UE of the MU-MIMO group.

And still further, as discussed above, the act of the base station configuring MU-MIMO service of each selected UE could involve the base station causing air interface transmission between the base station and the selected UE to occupy same time-frequency air interface resources (e.g., PRBs) as air interface transmission between the base station and another UE of plurality. Whereas, the act of the base station serving each other UE of the plurality of UEs without use of MU-MIMO could involve the base station causing air interface transmission between the base station and each other UE to occupy different time-frequency air interface resources than air interface transmission between the base station and any other UE of the plurality.

Figure 12:
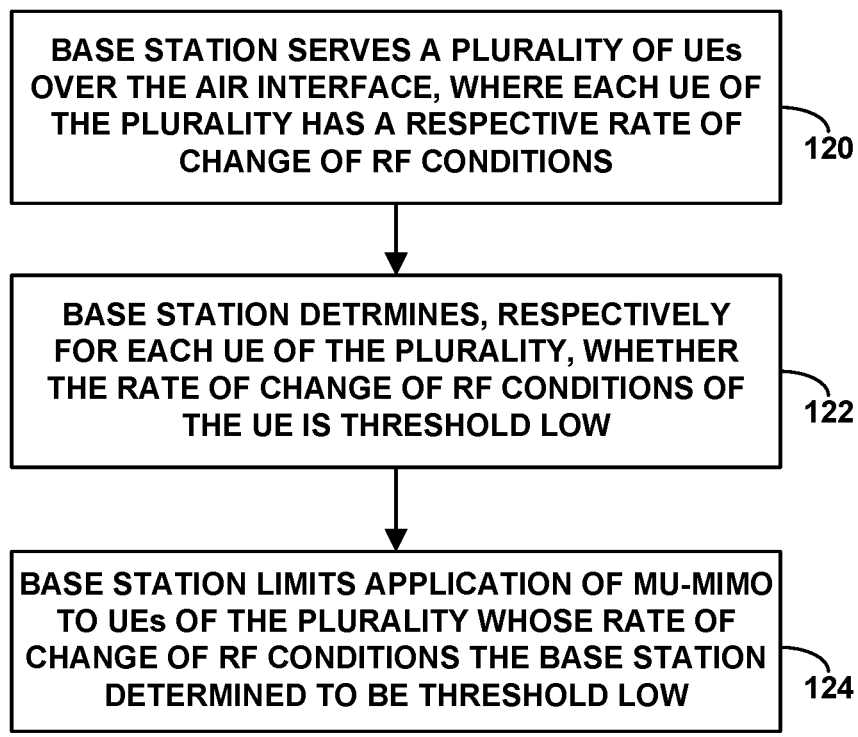
FIG. 12 is another flow chart depicting operations that can be carried out in accordance with the disclosure.

FIG. 12 is another flow chart depicting operations that can be carried out in accordance with this disclosure, to control transmission over an air interface in a wireless communication system. As shown in FIG. 12, at block 120, the operations include a base station serving a plurality of UEs over the air interface, where each UE of the plurality has a respective rate of change of RF conditions. At block 122, the operations include the base station determining, respectively for each UE of the plurality, whether the rate of change of RF conditions of the UE is threshold low. And at block 124, the operations include the base station limiting application of MU-MIMO to UEs of the plurality whose rate of change of RF conditions the base station determined to be threshold low.

In line with the discussion above, the operations could additionally include determining respectively for each UE the plurality the rate of change of RF conditions of the UE. Here again, for instance, the base station could determine the UE's rate of change of RF conditions in various ways as discussed above.

Further, the act of the base station limiting application of MU-MIMO to UEs of the plurality whose rate of change of RF conditions the base station determined to be threshold low could involve (i) the base station selecting at least a first UE of the plurality to receive MU-MIMO service, wherein the selecting is based at least on the rate of change of RF conditions of the first UE being at least as low as a predefined threshold level, and (ii) rejecting by the base station application of MU-MIMO service for at least a second UE of the plurality, wherein the rejecting is based at least on the rate of change of RF conditions of the second UE not being at least as low as the predefined threshold level.

Configuring MU-MIMO Service of Selected UEs

Through consideration of one or more of the above-discussed factors, among other possible factors, the base station could thus determine which of the base station's served UEs to provide with MU-MIMO service. Further, in the course of selecting the UEs to receive MU-MIMO service and/or as a separate step, the base station could establish one or more MU-MIMO groups of UEs to receive MU-MIMO service, based at least on the UEs in each MU-MIMO group being sufficiently orthogonal to each other as discussed above.

The base station could then configure MU-MIMO service of the selected UEs, and particularly of each MU-MIMO group.

For each MU-MIMO group, the base station could engage in signaling with each member UE to obtain channel estimates in order to facilitate beamforming and/or precoding of transmissions respectively to each UE.

Further, for each MU-MIMO group, the base station could cause air-interface transmissions between the base station all UEs of the MU-MIMO group to occupy the same time-frequency air interface resources (e.g., the same PRBs and constituent resource elements) as each other. For instance, the base station could transmit respectively to each UE in the group a DCI message that specifies allocated PRBs that will carry data to the UE, and the base station could thereby allocate the same PRBs to each UE in the group. In contrast, for any UE that the base station decides to not provide with MU-MIMO service, the base station could schedule transmissions between the base station and the UE to occur on different time-frequency air interface resources (e.g., different PRBs) than those that the base station schedules for use with respect to any other served UE.

Example Base Station Structure

FIG. 13 is a simplified block diagram of an example base station that could operate in accordance with the present disclosure. to control transmission over an air interface in a wireless communication system.

As shown in FIG. 13, the example base station includes a wireless communication interface 1300, a backhaul communication interface 1302, and a controller 1304, which could be integrated together and/or communicatively linked by a network, system bus, or other connection mechanism 1306.

Wireless communication interface 1300 includes a radio 1308, a power amplifier 1310, and antenna structure 1312. The radio could operate to interface between encoded baseband signals and RF signals. The power amplifier could operate to amplify signals for transmission by the antenna structure 1312. And the antenna structure 1312 could comprise a plurality of antennas for communicating over the air interface, where the air interface defines physical channel resources for carrying data wirelessly from the base station to a plurality of UEs served by the base station. As discussed above, the antenna structure could comprise an antenna array, such as a massive-MIMO array for instance.

Backhaul communication interface 1302 could be a network communication interface (e.g., an Ethernet network interface port and/or connection) through which the base station can communicate with various other network entities.

And controller 1304, which could comprise a processing unit, data storage, and program instructions stored in the data storage and executable by the processing unit, or could take other forms, could be operable to cause the base station to carry out various operations as described herein, for scheduling use of the physical channel resources to carry data wirelessly from the base station to the UEs Various features described above could be applied in this context, and vice versa.

Exemplary embodiments have been described above. Those skilled in the art will understand, however, that changes and modifications may be made to these embodiments without departing from the true scope and spirit of the invention.

We claim:

1. A method for controlling transmission over an air interface in a wireless communication system, the method comprising:
    serving, by a base station, multiple user equipment devices (UEs) over the air interface, wherein each UE of the multiple UEs has a respective power class defining a maximum transmission power of the UE;
    identifying, by a base station, a plurality of UEs of the multiple UEs served by the base station, the identifying being based on each UE of the plurality of UEs being located at least a predefined threshold distance from the base station;
    selecting by the base station, from the identified plurality of UEs, at least one of the UEs of the plurality to serve with Multi-User Multiple-Input-Multiple-Output (MU-MIMO) over the air interface, the selecting being based at least on the power class respectively of each selected UE; and
    based on the selecting, configuring by the base station MU-MIMO service of each selected UE, while serving by the base station each other UE of the plurality of UEs without use of MU-MIMO.

2. The method of claim 1, further comprising determining by the base station, respectively for each UE of the plurality, the power class of the UE.

3. The method of claim 2, wherein determining the power class of the UE comprises determining the power class by reference to profile data of the UE.

4. The method of claim 1,
    wherein the power class of each UE is selected from the group consisting of a standard power class, defining a first maximum transmission power, and a high power class, defining a second maximum transmission power higher than the first maximum transmission power, and
    wherein selecting at least one of the UEs of the plurality based at least on the power class respectively of each selected UE comprises selecting the UE based at least in part on the UE having the high power class rather than the standard power class.

5. The method of claim 4, wherein selecting the UE based at least in part on the UE having the high power class rather than the standard power class comprises, for each UE of the plurality:
    making a determination of whether the power class of the UE is the standard power class or is rather the high power class;
    if the determination is that the power class of the UE is the high power class rather than the standard power class, then, based at least on the determination, selecting the UE to serve with MU-MIMO over the air interface; and
    if the determination is that the power class of the UE is the standard power class rather than the high power class, then, based at least on the determination, not selecting the UE to serve with MU-MIMO over the air interface.

6. The method of claim 1, wherein selecting at least one of the UEs of the plurality to serve with MU-MIMO over the air interface with the selecting being based at least on the power class respectively of each selected UE comprises:
    comparing the power class of a first one of the UEs of the plurality with the power class of a second one of the UEs of the plurality;
    based on the comparing, determining that the power class of the first UE is higher than the power class of the second UE; and
    based on the determining, selecting the first UE rather than the second UE to receive MU-MIMO service over the air interface.

7. The method of claim 1, further comprising including each selected UE in a MU-MIMO group of UEs based on a further determination that the selected UE is orthogonal to each other UE of the MU-MIMO group.

8. The method of claim 1,
    wherein configuring by the base station MU-MIMO service of each selected UE comprises causing by the base station air interface transmission between the base station and the selected UE to occupy same time-frequency air interface resources as air interface transmission between the base station and another UE of the plurality, and wherein serving by the base station each other UE of the plurality of UEs without use of MU-MIMO comprises causing by the base station air interface transmission between the base station and each other UE to occupy different time-frequency air interface resources than air interface transmission between the base station and any other UE of the plurality.

9. A method for controlling transmission over an air interface in a wireless communication system, the method comprising:

serving, by a base station, a plurality of user equipment devices (UEs) over the air interface, wherein each UE of the plurality has a respective power class defining a maximum transmission power of the UE;

identifying by the base station a subset of the served UEs based on each UE of the subset being located at least a predefined threshold distance from the base station;

determining by the base station, respectively for each UE of the subset, whether the power class of the UE is a high power class defining a first maximum transmission power or rather a low power class defining a second maximum transmission power lower than the first maximum transmission power; and as to the subset, limiting by the base station application of Multi-User Multiple-Input-Multiple-Output (MU-MIMO) to each UE of the subset whose power class the base station determined to be the high power class.

10. The method of claim 9, further comprising determining by the base station, respectively for each UE of the subset, the power class of the UE.

11. The method of claim 10, wherein determining the power class of the UE comprises determining the power class by reference to profile data of the UE.

12. The method of claim 9, wherein limiting by the base station application of MU-MIMO to each UE of the subset whose power class the base station determined to be the high power class comprises, for a given UE of the subset:

if the determined power class of the UE is the high power class rather than the standard power class, then, based at least on the determination, configuring MU-MIMO service of the UE; and if the determination is that the power class of the UE is the standard power class rather than the high power class, then, based at least on the determination, not configuring MU-MIMO service of the UE.

13. The method of claim 9, further comprising grouping by the base station UEs of the plurality into a MU-MIMO group based on a determination that the UEs of the MU-MIMO group are orthogonal to each other.

14. A base station operable in a wireless communication system to control transmission over an air interface, the base station comprising:

an antenna array comprising a plurality of antennas for communicating over the air interface, wherein the air interface defines physical channel resources for carrying data wirelessly from the base station to multiple user equipment devices (UEs) served by the base station, wherein each UE of the multiple UEs has a respective power class defining a maximum transmission power of the UE; and a controller for scheduling use of the physical channel resources to carry data wirelessly from the base station to the UEs, wherein the controller is configured to identify a plurality of UEs of the multiple UEs served by the base station, the identifying being based on each UE of the plurality of UEs being located at least a predefined threshold distance from the base station, wherein the controller is further configured to select, from the identified plurality of UEs, at least one of the UEs of the plurality to serve with Multi-User Multiple-Input-Multiple-Output (MU-MIMO) over the air interface, the selecting being based at least on the power class respectively of each selected UE, and wherein the controller is further configured, based on the selecting, to cause the base station to provide MU-MIMO service to each selected UE while the base station serves each other UE of the plurality of UEs without use of MU-MIMO.

15. The base station of claim 14, wherein the controller comprises a processing unit, data storage, and program instructions stored in the data storage and executable by the processing unit to carry out the selecting and the causing.

16. The base station of claim 14, wherein the controller is further configured to determine, respectively for each UE of the plurality the power class of the UE.

17. The base station of claim 16, wherein determining the power class of the UE comprises determining the power class by reference to profile data of the UE.

18. The base station of claim 14, wherein the power class of each UE is selected from the group consisting of a standard power class, defining a first maximum transmission power, and a high power class, defining a second maximum transmission power higher than the first maximum transmission power, and wherein selecting at least one of the UEs of the plurality based at least on the power class respectively of each selected UE comprises selecting the UE based at least in part on the UE having the high power class rather than the standard power class.

* * * * *